US008644319B2

(12) United States Patent
Breslow et al.

(10) Patent No.: US 8,644,319 B2
(45) Date of Patent: *Feb. 4, 2014

(54) METHOD OF DATA TRANSMISSION IN A DATA COMMUNICATION NETWORK

(75) Inventors: Noah J. Breslow, Seattle, WA (US); Nathan D. T. Boyd, Seattle, WA (US); Greg A. Torluemke, Kirkland, WA (US)

(73) Assignee: Wengen Wireless LLC, Bellevue, WA (US)

(*) Notice: Subject to any disclaimer, the term of this patent is extended or adjusted under 35 U.S.C. 154(b) by 406 days.

This patent is subject to a terminal disclaimer.

(21) Appl. No.: 12/903,391

(22) Filed: Oct. 13, 2010

(65) Prior Publication Data

US 2011/0026528 A1     Feb. 3, 2011

Related U.S. Application Data

(60) Continuation of application No. 10/314,105, filed on Dec. 6, 2002, now Pat. No. 7,817,639, which is a division of application No. 09/151,994, filed on Sep. 11, 1998, now Pat. No. 6,493,342.

(51) Int. Cl.
    *H04L 12/56*      (2011.01)

(52) U.S. Cl.
    USPC ............................ 370/394; 370/474; 370/529

(58) Field of Classification Search
    USPC ........ 370/395.2, 395.3, 395.5, 410, 428, 470, 370/472, 476, 506, 512, 316, 326, 345, 349, 370/394, 465, 471, 473, 474, 493, 494, 495, 370/522, 524, 527, 528, 529, 523, 537, 538, 370/540
See application file for complete search history.

(56) References Cited

U.S. PATENT DOCUMENTS 4,617,657 A    10/1986   Drynan et al.
4,841,526 A     6/1989   Wilson et al.
(Continued)

FOREIGN PATENT DOCUMENTS

EP          0447725 A2    9/1991
WO     WO-98/16046 A1   4/1998
WO     WO-98/34385 A1   8/1998

OTHER PUBLICATIONS

"Series I: Integrated Services Digital Network, Integrated Services Digital Network, Overall Network Aspects and Functions-Protocol Layer Requirements," International Telecommunication Union, Aug. 1996.

(Continued)

*Primary Examiner* — Chuong T Ho
(74) *Attorney, Agent, or Firm* — Novak Druce Connolly Bove + Quigg LLP

(57) ABSTRACT

In a method of data transmission in a data communication network, data packets may be formatted according to different transmission protocols ("secondary data packets") that are received for transmission through the data communication network and may be packed into one or more "primary data packets" formatted according to the transmission protocol of the data communication network. In addition to a sequence number, the primary data packets may include a first packet offset to identify the location of a first new secondary data packet that is packed into the primary data packet. A first packet offset field length may be determined during connection negotiation. The data transmission method of the invention may include packing one or more secondary data packets, or a portion thereof, in a primary data packet to fill the primary data packet, thus minimizing unused data bits in the primary data packet.

12 Claims, 13 Drawing Sheets

(56) References Cited

U.S. PATENT DOCUMENTS

| | | | |
|---|---|---|---|
| 4,924,513 A | 5/1990 | Herbison et al. | |
| 4,951,278 A | 8/1990 | Biber et al. | |
| 5,097,261 A * | 3/1992 | Langdon et al. | 341/51 |
| 5,257,397 A | 10/1993 | Barzegar et al. | |
| 5,425,028 A | 6/1995 | Britton et al. | |
| 5,495,240 A | 2/1996 | Heberle | |
| 5,644,568 A * | 7/1997 | Ayerst et al. | 370/311 |
| 5,646,959 A | 7/1997 | Kamishima | |
| 5,648,960 A * | 7/1997 | Sakazaki et al. | 370/498 |
| 5,774,662 A | 6/1998 | Sakagawa | |
| 5,790,530 A | 8/1998 | Moh et al. | |
| 5,822,524 A * | 10/1998 | Chen et al. | 709/203 |
| 5,825,780 A | 10/1998 | Christie | |
| 5,884,175 A | 3/1999 | Schiefer et al. | |
| 5,933,104 A | 8/1999 | Kimura | |
| 6,052,386 A * | 4/2000 | Achilleoudis et al. | 370/470 |
| 6,112,304 A | 8/2000 | Clawson | |
| 6,119,000 A | 9/2000 | Stephenson et al. | |
| 6,119,159 A | 9/2000 | Tseng et al. | |
| 6,134,237 A * | 10/2000 | Brailean et al. | 370/394 |
| 6,157,674 A * | 12/2000 | Oda et al. | 375/240 |
| 6,199,149 B1 | 3/2001 | Meinerth et al. | |
| 6,212,190 B1 | 4/2001 | Mulligan | |
| 6,246,683 B1 | 6/2001 | Connery et al. | |
| 6,266,700 B1 | 7/2001 | Baker et al. | |
| 6,298,420 B1 | 10/2001 | Chittor et al. | |
| 6,310,893 B1 * | 10/2001 | Yuan et al. | 370/474 |
| 6,393,153 B2 | 5/2002 | Ozaki | |
| 6,418,143 B1 | 7/2002 | Rezaiifar et al. | |
| 6,434,151 B1 | 8/2002 | Caves et al. | |
| 6,493,342 B1 * | 12/2002 | Breslow et al. | 370/394 |
| 6,560,203 B1 | 5/2003 | Beser et al. | |
| 6,735,202 B1 | 5/2004 | Ahmed et al. | |
| 6,801,508 B1 | 10/2004 | Lim | |
| 6,874,082 B2 | 3/2005 | Tateyama et al. | |
| 7,046,642 B1 | 5/2006 | Cheng et al. | |
| 7,411,975 B1 | 8/2008 | Mohaban | |
| 7,548,553 B2 | 6/2009 | Meier | |
| 7,680,148 B2 | 3/2010 | Nishibayashi et al. | |
| 7,817,639 B2 * | 10/2010 | Breslow et al. | 370/395.2 |
| 2001/0034736 A1 | 10/2001 | Eylon et al. | |
| 2001/0047433 A1 | 11/2001 | Boucher et al. | |
| 2002/0062407 A1 | 5/2002 | Tateyama et al. | |
| 2003/0021279 A1 | 1/2003 | Shobatake | |
| 2003/0067884 A1 | 4/2003 | Abler et al. | |
| 2003/0081609 A1 * | 5/2003 | Breslow et al. | 370/394 |
| 2006/0062250 A1 | 3/2006 | Payne | |
| 2007/0058656 A1 * | 3/2007 | Breslow et al. | 370/437 |

OTHER PUBLICATIONS

"Series I: Integrated Services Digital Network, Overall Network Aspects and Functions-Protocol Layer Requirements," International Telecommunication Union, Sep. 1997.

"QoS Guarantees for Multimedia Services on a TDMA-Based Satellite Network," Mauger, R.; Rosenberg, C.; Communications Magazine, IEEE vol. 35, Issue 7, Digital Object Identifier: 10.1109/35.601743 Publication Year: 1997.

"ADAPTIVE; A Flexible and Adaptive Transport System Architecture to Support Lightweight Protocols for Multimedia Applications on High-Speed Networks," Schmidt, D.C.; Box, D.F.; Suda, T.; High-Performance Distributed Computing, 1992 (HPDC-1), Proceedings of the First International Symposium on Digital Object Identifier, 10.1109/HPDC, 1992.

"Method to Establish a Network Connection Dynamically," IBM Technical Disclosure Bulletin, vol. No. 29, Issue 2, p. 892-900, Publication date: Jul. 1, 1986, US.

* cited by examiner

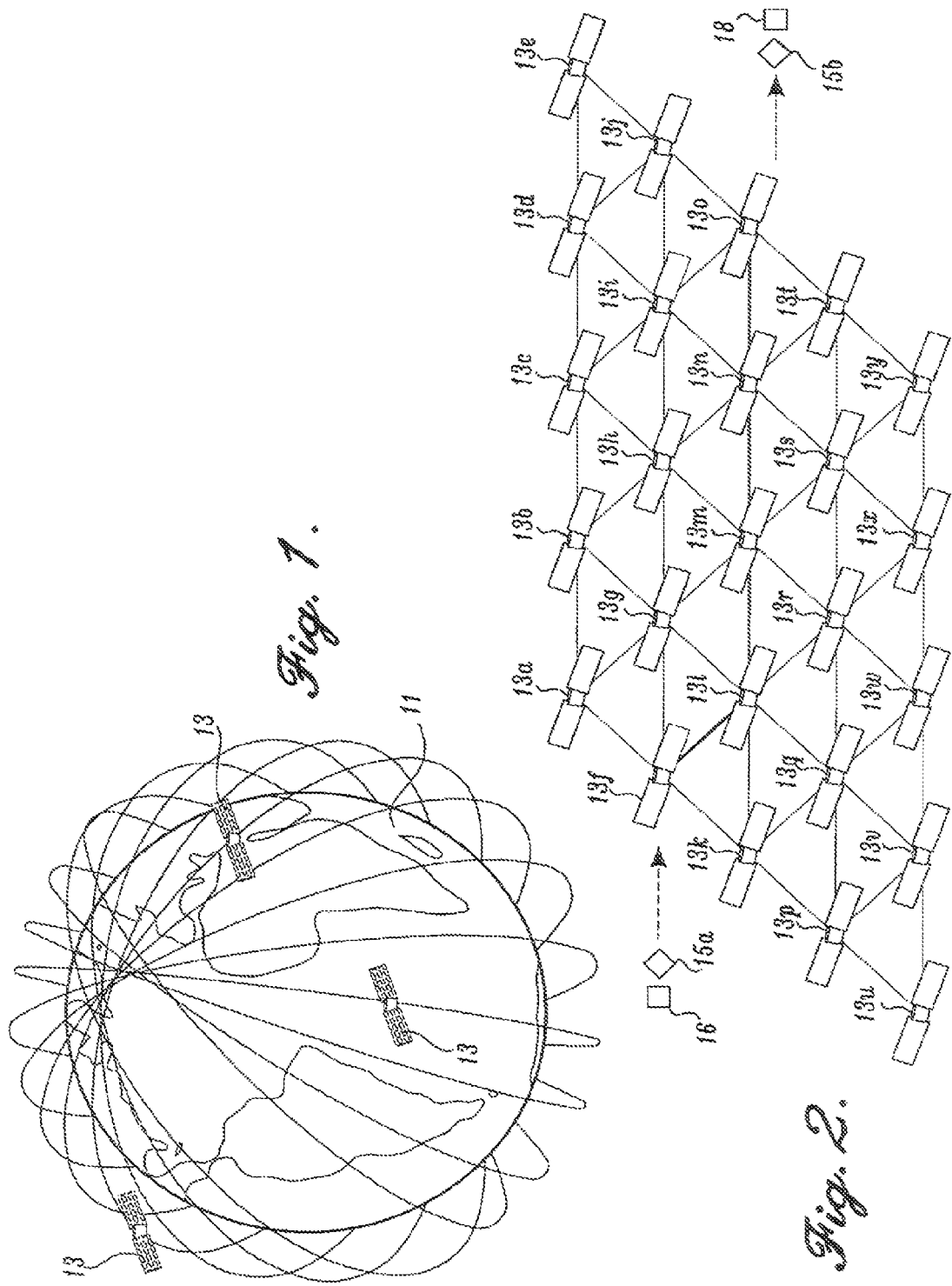

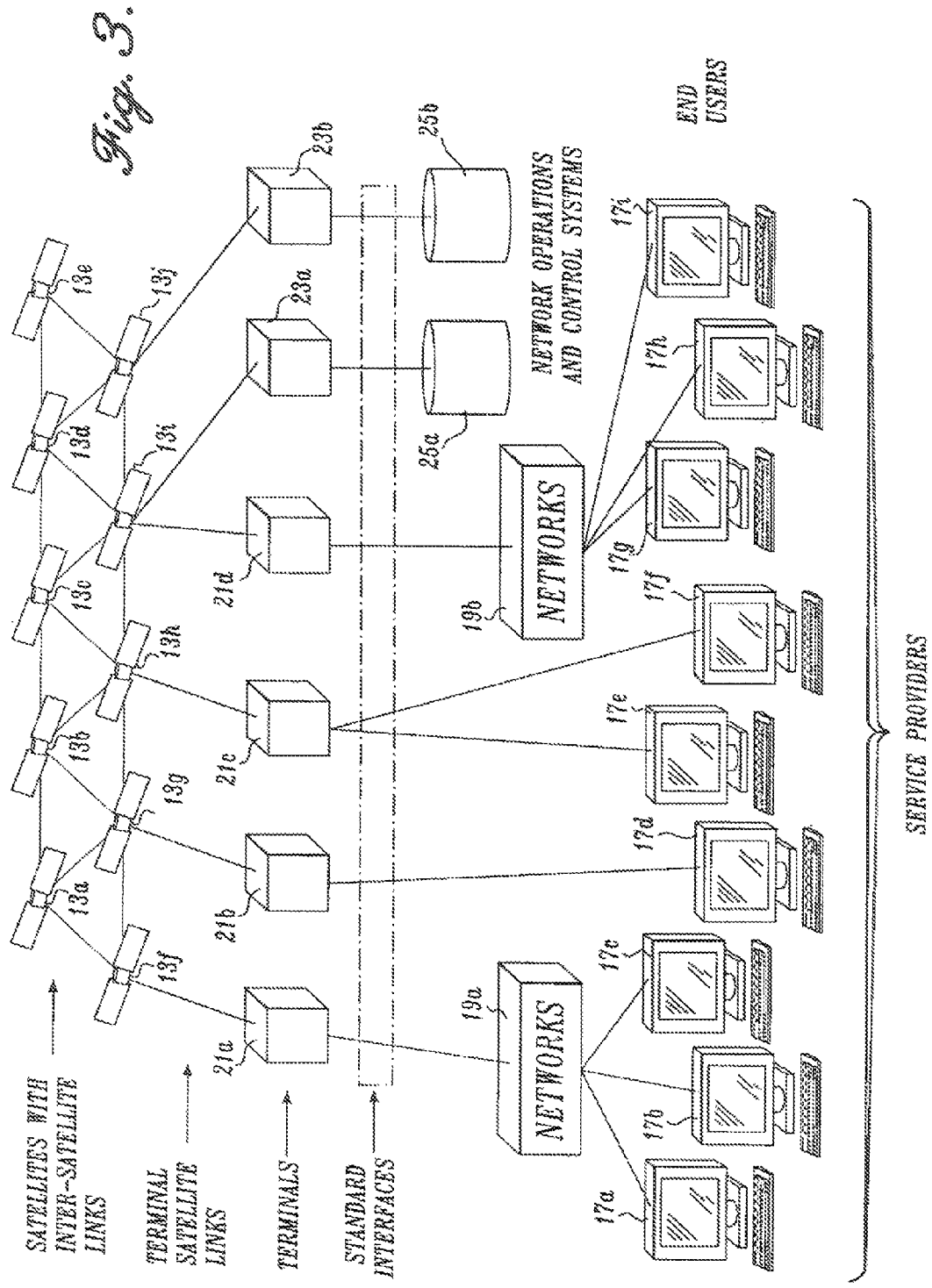

METHOD OF DATA TRANSMISSION IN A DATA COMMUNICATION NETWORK

CROSS-REFERENCE TO RELATED APPLICATION

This application is a continuation of co-pending U.S. patent application Ser. No. 10/314,105, filed on Dec. 6, 2002, which is a division of U.S. patent application Ser. No. 09/151,994, filed on Sep. 11, 1998 (which has issued as U.S. Pat. No. 6,493,342), the contents of both of which are expressly incorporated herein by reference in their entirety.

FIELD OF THE INVENTION

The present invention relates to data communication, and particularly to data transmission in data communication networks.

BACKGROUND OF THE INVENTION

In recent years, the need for global data networking capability has rapidly expanded. Computers at one location often have a need to transmit data to computers at a distant location. In order to meet this need, broadband satellite communication systems have been proposed as an alternative to land-based communication systems. One type of satellite communication system is described in a number of U.S. patents assigned to the assignee of this patent application, including U.S. Pat. Nos. 5,386,953; 5,408,237; 5,527,001; 5,548,294; 5,621,415; 5,641,135; 5,642,122; 5,650,788; 5,736,959; and 5,740,164. These patents and other pending applications assigned to the assignee of this patent application describe a satellite communication system that includes a constellation of low-Earth-orbit (LEO) satellites capable of transmitting data from one location on the Earth's surface to another location. Each LEO satellite has a communication footprint that covers a portion of the Earth's surface as the satellite passes over the Earth. The communication footprint defines the area of the Earth within which ground terminals can communicate with the satellite. During the period of time a ground terminal remains within the borders of a satellite footprint, the ground terminal may transmit data to and receive data from the "servicing" satellite. When a satellite reaches the end of its servicing arc, another satellite in orbit is positioned to "service" the ground terminal previously covered by the satellite reaching the end of its servicing arc.

Data to be sent from one location on the Earth to another location is transmitted from a source ground terminal to the satellite servicing the ground terminal via an uplink data channel. The data is routed through the constellation of LEO satellites to the satellite servicing the ground terminal that is to receive the data. The latter satellite transmits the data to the destination ground terminal via a downlink data channel. Thus, the constellation of LEO satellites and the ground terminals form a data communication network wherein the ground terminals and satellites form nodes of the network.

A data communication network uses a transmission protocol to govern the format and manner in which data communication takes place in the network. Data to be communicated through a network is typically broken up and formatted into digital data "packets." The resulting data packets are addressed and routed through the network to a destination terminal in accordance with the transmission protocol used by the network.

In a preferred embodiment of the LEO satellite communication system described above, the data packets are routed independently through the satellites in the constellation. The data packets may therefore arrive at the destination ground terminal in a different order than which they were sent by the source ground terminal. The communication handoff from one servicing satellite to the next servicing satellite and changes in the phasing of satellites in their orbital planes may also contribute to out-of-order delivery of the data packets.

For circumstances in which in-order packet delivery is required (e.g., by the transmission protocol of the data packets), sequence information may be included in the data packets prior to transmission. While sequence information that is included in a data packet may be used to reorder the transmitted data packets, the sequence information adds to the overhead information for routing and control that is transmitted in each data packet. Where transmission resources in a data communication network are limited, adding to the overhead information in transmitted data packets reduces the communication efficiency of the data communication network. The added information uses resources that could otherwise be used for transmitting user data. A need therefore exists for a method to minimize the number of bits used in a data packet for sequence information so that transmission overhead is reduced while still providing a mechanism for reordering packets delivered out of order.

Furthermore, a destination terminal may receive data packets from a number of different source terminals. Without using dedicated communication links to effectively identify the source of the data packets and the particular data transmission in which the packets were sent, the data packets themselves must include source information so that the destination terminal will know how to organize and process the incoming data packets. In some existing networks (e.g., networks using Internet Protocol), data packets include a source terminal's complete network address in their routing and control information to identify the transmission source. However, as noted above, adding to the transmission overhead information reduces the data communication efficiency of the network. A complete network address is often longer than necessary to adequately identify a data transmission source to a destination terminal. A need therefore exists for a method to minimize the number of bits in a data packet allocated for a source identifier.

A need also exists for a method of setting up a source identifier having a minimal number of bits allocated to the source identifier, as discussed above. In some existing networks (e.g., networks using Frame Relay or Asynchronous Transfer Mode (ATM) protocol), contexts are set up for data transmissions from one point to another in the network in which labels are set up to identify the transmission over a particular link. However, these labels have no meaning outside of that particular point-to-point link. In other networks, header compression schemes have been used in which routing and control information in a data packet is compressed and later reconstructed. These compression schemes, however, have been limited to point-to-point links as well. Accordingly, there is a need for a method of data transmission that spans a plurality of point-to-point transmission links and uses a reduced-size source identifier that has meaning to the destination end of the data transmission.

As noted above, a transmission protocol governs the format and manner in which data transmission takes place in a data communication network. Those skilled in the art of data communication will appreciate that different computer networks may use different transmission protocols that are not directly compatible with one another. For example, an Internet Protocol (IP) network may incorporate subnetworks and links that use ATM protocol. An adaptation is required before an IP packet can be communicated through an ATM link. In order for a LEO satellite data communication network to be competitive in a market with diverse end users desiring to transmit data via the satellite network, the satellite network must allow for transmission of data packets formatted according to a wide variety of data transmission protocols that are potentially incompatible with the transmission protocol of the satellite network.

Moreover, because end users typically use a satellite, network only as an intermediary in the transmission of data, it is preferable that the operation of the satellite network be "invisible" to the end users. Accordingly, there is a need for a data transmission method that efficiently transmits different protocol data packets through a satellite network such that the data packets received by an end user at the receiving end of a data communication are in the same format as sent by an end user at the sending end of the communication, even when the packets are received out of order.

The present invention provides a method of data transmission that addresses the above-identified needs and other shortcomings in the prior art.

SUMMARY OF THE INVENTION

The present invention is a method of data transmission in a data communication network. In accordance with the present invention, a data communication network, such as a LEO satellite data communication network of the type discussed above, receives data packets formatted according to a wide variety of different transmission protocols for transmission through the data communication network. The different protocol data packets (also referred to herein as "secondary data packets") that are received by the data communication network are packed into new data packets formed in accordance with the transmission protocol of the data communication network (also referred to herein as "primary data packets"). The primary data packets are then transmitted through the data communication network. Where packet reordering is required, the transmitted primary data packets are reordered if received out of order. The secondary data packets are then unpacked from the primary data packets and placed in an output queue.

According to one aspect of the invention, the primary data packets transmitted through the data communication network include variable length-fields for recording a source identifier, sequence number, and first packet offset. The field lengths for the source identifier, sequence number, and first packet offset fields are established during a connection negotiation process that occurs prior to the data transmission. In the connection negotiation process, a source terminal and destination terminal in the data communication network exchange one or more messages to establish a "connection," or association, between the respective terminals.

The source identifier field holds a source identifier that uniquely identifies the data transmission, or connection, to the destination terminal. If a destination terminal decides to admit a connection after receiving a connection request, the destination terminal determines the number of bits to be assigned to the source identifier field. The length of the source identifier field is based largely on the number of connections the destination terminal is handling or expects to handle.

The sequence number field in a primary data packet holds a value indicating the relative position of the data packet in a series of primary data packets. The sequence number field length is primarily based on the number of data packets expected to be transmitted in the connection during a particular period of time. The number of data packets may be derived from connection parameters, such as the bandwidth allotted to the connection, as well as the "time to live" of a primary data packet.

During the connection negotiation process, the destination terminal also determines a field length for a first packet offset field. The first packet offset field in a primary data packet holds information indicating the location at which a first new secondary data packet is packed into the primary data packet. The first packet offset parameter is used in unpacking secondary data packets from the primary data packets transmitted through the data communication network.

To report the connection admission to the source terminal, the destination terminal sends a connection reply. The destination terminal communicates the determined field lengths for the source identifier, sequence number, and first packet offset fields to the source terminal in the connection reply. During the connection negotiation process, the destination terminal also assigns a unique source identifier for the connection and communicates the source identifier to the source terminal in the connection reply.

For an embodiment of the invention described herein, primary data packets have an overall fixed length. As secondary data packets are packed into primary data packets, if a secondary data packet does not completely fill a primary data packet, another secondary data packet is added to the same primary data packet until the primary data packet is filled. If the available "space" remaining at the end of a primary packet is smaller than the length of the next secondary data packet to be packed, the next secondary data packet is preferably divided to define a portion that fills the available space. The remaining, unpacked portion of the secondary data packet is carried over and packed in a new primary data packet. The packing operation is repeated for all of the secondary data packets to be transmitted in the connection. In this manner, the available space in a primary data packet is more fully used, thus improving the data transmission efficiency of the data communication network.

After the primary data packets are transmitted, the destination terminal reorders the received primary data packets (if necessary) and unpacks the secondary data packets. The destination terminal uses the first packet offset value in the received primary data packet to locate secondary data packets for unpacking. The first packet offset allows secondary data packets to be unpacked from the received primary data packets even if one or more transmitted primary data packets are lost, delayed, or received out of order.

It is appreciated that optimizing field lengths for the source identifier, sequence number, and first packet offset fields, and transmitting different protocol data packets through the data communication network are applicable to many types of data communication networks and are particularly suitable for a LEO satellite data communication network.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 1 is a pictorial diagram illustrating orbital paths of a constellation of low-Earth-orbit (LEO) satellites positioned to cover the Earth's surface;

FIG. 2 is a plan view of a portion of the constellation of LEO satellites depicted in FIG. 1 with interconnecting lines illustrating intersatellite communication;

FIG. 3 is a pictorial diagram illustrating the major components of a LEO satellite data communication network of the type shown in FIGS. 1 and 2, with interconnecting lines illustrating communication therebetween;

FIGS. 12-16 illustrate a working example of a data transmission performed according to the present invention wherein FIG. 12 is a pictorial diagram of seven secondary data packets having different packet lengths;

FIG. 13 is a pictorial diagram of four primary data packets having the seven secondary data packets of FIG. 12 packed therein;

FIG. 14 is a pictorial diagram of the four primary data packets of FIG. 13 after out-of-order delivery;

FIG. 15 is a pictorial diagram of the four primary data packets of FIG. 14 after a reordering procedure; and FIG. 16 is a pictorial diagram of the seven secondary data packets unpacked from the four primary data packets shown in FIG. 15.

DETAILED DESCRIPTION OF THE PREFERRED EMBODIMENT

Figure 4:
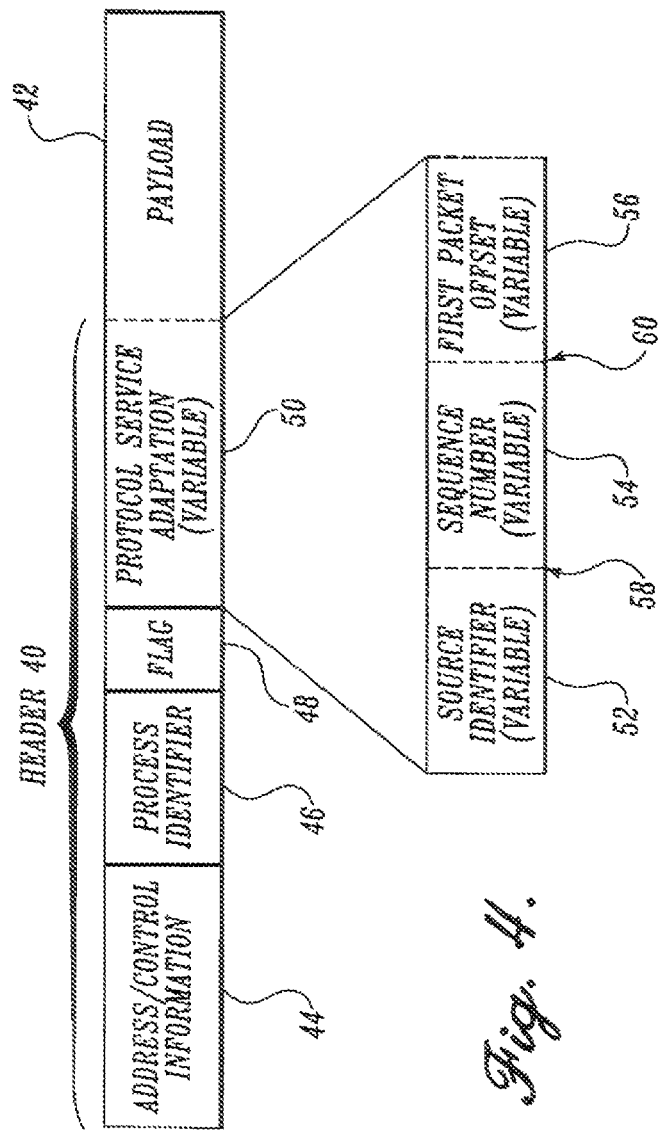
FIG. 4 illustrates a data packet configuration for a primary data packet that is formed in accordance with the present invention.

The present invention is a method of data transmission in a data communication network, such as a low-Earth-orbit (LEO) satellite data communication network. The method includes negotiating a connection between a source terminal and a destination terminal, during which certain connection parameters are optimized. A brief description of a LEO satellite data communication network is provided first, after which aspects of the invention with respect to connection negotiation and the connection parameters are discussed. Following that, a detailed description of one embodiment of the invention is given in which the connection parameters are used in transmitting data formatted according to different transmission protocols. Lastly, a working example of a data transmission using the principles of the invention is provided.

A LEO satellite data communication network includes a constellation of satellites orbiting the Earth such that the vast majority of the Earth is within the transmission range of at least one satellite at any point in time. One proposed LEO satellite communication network employs 288 satellites, plus spares, located in 12 polar orbit planes. Each plane includes 24 satellites at an altitude of approximately 1,350 kilometers. The path of travel of the satellites in such a network is generally depicted in FIG. 1. More specifically, FIG. 1 depicts the Earth 11 surrounded by a plurality of rings that illustrate the orbital planes of a plurality of satellites 13.

FIG. 2 illustrates a number of satellites 13a, 13b, 13c ... 13y that make up the constellation of satellites in a LEO satellite communication network as shown in FIG. 1. The satellites are shown in close proximity to one another for illustrative purposes only. As shown in FIG. 2, a data signal 15a, consisting of one or more data packets, is transmitted on an uplink channel by a source ground terminal 16 to a first satellite 13f that forms part of the constellation of satellites. The uplink satellite 13f transmits one or more of the data packets to a second satellite 13l, which transmits the data packets to a third satellite 13m, which transmits the data packets to a fourth satellite 13n. The routing of the data packets continues until the data packets reach the satellite 13o that services a destination ground terminal 18 that is to receive the data packets. Finally, the servicing satellite 13o transmits the data packets via a downlink signal 15h to the destination ground terminal 18. The actual routing path taken by a data packet may depend on network traffic and other concerns such as data priority and allocation of transmission resources. Preferably, the data packets are routed independently through the constellation of satellites using the most efficient routes.

FIG. 3 illustrates further aspects of a LEO satellite data communication network of the type shown in FIGS. 1 and 2. End users 17a, 17b, 17c ... 17i are connected to the satellite network either through an intermediate network 19a or 19b, or by direct connection, to a ground terminal 21a, 21b, 21c, or 21d. The networks 19a and 19b may be, for example, conventional public telephone system communication networks, corporate local area or wide area networks, or other proprietary networks. Satellite network operations and control systems 25a and 25b are shown communicating with the satellites via separate ground terminals 23a and 23b. All of the ground terminals (e.g., ground terminals 21a, 21b, 21c, and 21d) are designed to transmit signals to and receive signals from the constellation of satellites via uplink and downlink data channels, and thus may act as both a "source terminal" and a "destination terminal," as referred to herein.

In accordance with the present invention, prior to transmitting data packets to a destination terminal, a source terminal negotiates and establishes a network association, or "connection," with the destination terminal. When establishing a connection, a source terminal and a destination terminal negotiate one or more connection parameters to be used in coordinating the data transmission. It should be understood that a "connection," as discussed herein, does not imply a forced routing path between a source terminal and a destination terminal, nor does it require dedicated transmission links. Hence, the term "connection" should not be confused with similar terminology used in regard to networks that require dedicated transmission links. A "connection," as used herein, is an association between a source terminal and a destination terminal that identifies a data transmission and the parameters associated therewith. A more detailed description of one procedure for negotiating connection parameters and establishing a connection between a source terminal and a destination terminal is provided later in reference to FIG. 5.

Once a connection is established between a source terminal and a destination terminal, the source terminal may transmit data messages through the data communication network to the destination terminal. Rather than each data message being continuously transmitted, as is well-known in analog wireless telephone communication and other communication arts, data messages sent through a digital data communication network are divided into one or more digital data "packets."

Data packets configured in accordance with the invention include a header portion for carrying address and control information, and a payload, or data portion, for carrying the data to be transmitted. A data communication network, such as a LEO satellite data communication network, uses the address and control information in the header to route the data packet through the network to the intended destination. The payload portion may include data of many different types and formats. For example, a data packet payload may carry specially formatted user data provided by an end user linked to the data communication network for transmission to another end user. A data packet payload may also carry, for example, network management information and instructions sent by a network administrator to one or more network entities (e.g., a ground terminal, a satellite processor, etc.), or network communications sent from one network entity to another, such as a connection request sent from a source terminal to a destination terminal.

FIG. 4 illustrates one data packet configuration in accordance with the principles of the present invention. The data packet illustrated in FIG. 4 is comprised of a header portion 40 and a payload portion 42. The header portion 40 includes bits for storing address and control information 44, which includes the network address of the destination terminal to which the data packet is to be sent. The header portion 40 shown in FIG. 4 also includes bits for storing a process identifier 46, flag information 48, and protocol service adaptation information 50. The payload portion 42 includes bits for storing the data being transmitted. Those with ordinary skill in the art of data communication should appreciate that FIG. 4 illustrates merely one example of many possible data packet configurations that may be formed in accordance with the present invention.

The process identifier 46 in the data packet shown in FIG. 4 may be used by a destination terminal to identify a specific service or process for handling the data once it is transmitted through the network. For instance, if the data originated from an Internet Protocol (IP) data source, a value may be inserted in the process identifier field 46 to alert the destination terminal that an IP connectivity process should handle the incoming data. Different services and processes may be set up for handling data packets transmitted in different connections.

The flag information 48 may be used to indicate the existence of certain types of information within the payload 42. For instance, in some circumstances, it is advantageous to piggyback network management information in data packets otherwise containing user data. Often referred to as "in-band" signaling, the flag information 48 may hold a value (e.g., a "1") indicating that the first 8 or 16 bytes, for example, of the data packet payload carry network management information. Conversely, the flag information 48 may hold a value (e.g., a "0") indicating that network management information has not been piggybacked in the data packet.

Furthermore, in accordance with the present invention, the protocol service adaptation information 50 includes a variable number of bits for storing a source identifier 52, a sequence number 54, and a first packet offset 56. The number of bits used for storing the source identifier 52, sequence number 54, and first packet offset 56 is optimized for a particular connection at the time the connection is established and may vary from connection to connection. A procedure for establishing field lengths (i.e., number of bits) for the source identifier 52, sequence number 54, and first packet offset 56 is further described below in reference to FIG. 5.

According to the present invention, the source identifier 52 is an "end-to-end" connection parameter that, in conjunction with other routing information in a data packet (such as the network address of the destination terminal), identifies the connection to the destination end of the data transmission. A source identifier 52 is established by a destination terminal during connection negotiation with a source terminal. The destination terminal determines a unique source identifier for each connection it is handling so that, as data packets are received by the destination terminal, the destination terminal can distinguish between the connections it is handling and process each of the received packets according to the connection to which the data packet pertains.

In addition to identifying a connection, the source identifier 52 also serves to identify the source terminal originating the data transmission. By inspecting the source identifier and, as necessary, other routing information (e.g., the network address of the destination terminal) included in a data packet, the source terminal sending the data packet may be determined. Thus, according to the present invention, the negotiated source identifier is substituted for the network address of the source terminal in the data packets transmitted in a connection.

Preferably, the source identifier 52 is shorter in length than the source terminal's network address. Because the source identifier 52 substitutes for a source terminal's network address in identifying the source of a data packet, an improved data transmission efficiency is obtained when the source identifier occupies fewer bits in the data packet than what the source terminal's network address would have occupied had it been included. By transmitting data packets that use fewer bits for source identification, the limited transmission resources of a data communication network are more advantageously conserved for transmitting actual user data.

The sequence number 54 in a data packet identifies the position of the data packet in a series of data packets transmitted in a connection. Because data packets transmitted in a particular connection may be routed through different transmission paths in the data communication network, the data packets may arrive at the destination terminal in a different order than originally sent. To accommodate circumstances in which packet reordering is required, a source terminal assigns an increasing (or decreasing) sequence number 54 to the data packets prior to transmitting the packets. The sequence number 54 assists the destination terminal in correctly reordering the data packets when they are received.

The first packet offset 56 is included in a data packet for identifying the location of particular data recorded in the payload 42 of the data packet. Before discussing the purpose and use of the first packet offset 56, a discussion of one type of data transmission provided by the present invention is given. The first packet offset 56 will be better understood as it relates to the data transmission described.

Data to be transmitted in a data communication network may come from a wide variety of sources, including other computer networks linked to the data communication network. Because different computer networks may use different transmission protocols, and because the format of a data packet is largely determined by the transmission protocol of the network in which it is sent, data received from an outside source may come in a wide variety of formats that are potentially incompatible with the transmission protocol of the data communication network of the invention. The present invention provides a method for receiving different protocol data packets and transmitting the data packets through the data communication network.

For purposes of demonstrating this aspect of the present invention, it is presumed that the transmission protocol of a data communication network of the invention (e.g., the LEO satellite network earlier described) is different from the transmission protocol of an outside data source. Furthermore, to simplify terms for discussion herein, data packets formatted according to the transmission protocol of the data communication network are referred to herein as "primary" data packets. Data packets formatted according to the transmission protocol of the outside data source are referred to as "secondary" data packets.

Briefly stated, in accordance with the present invention, secondary data packets received by a source terminal are packed, or recorded, into the payload of one or more primary data packets for transmission through the data communication network. Following transmission, the destination terminal receiving the primary data packets unpacks the secondary data packets from the payload of the primary data packets. In one embodiment of the invention, unpacking is performed by copying the secondary data packets from the primary packet payload to an output queue implemented in memory. If in-order packet delivery is required for the secondary packets, the primary data packets are first reordered according to their respective sequence number (if delivered out of order) so that the secondary data packets are unpacked and produced in the same order as originally received by the source terminal.

Figure 12:
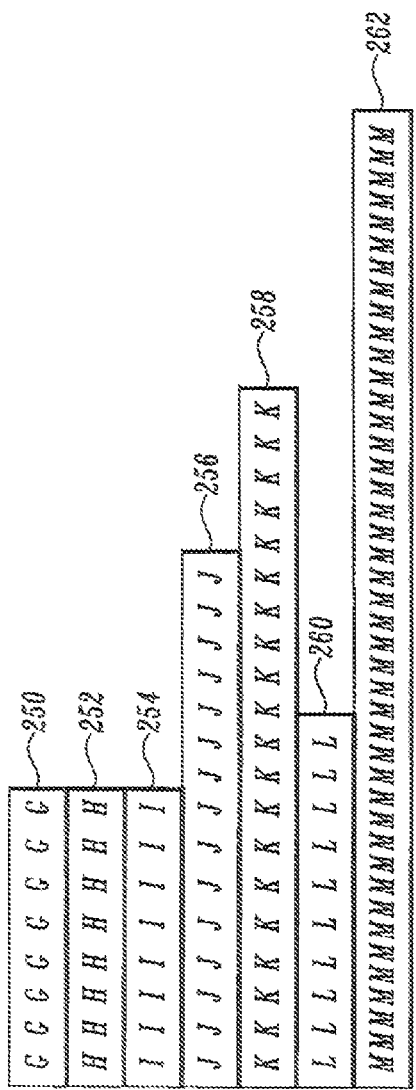
Figure 13:
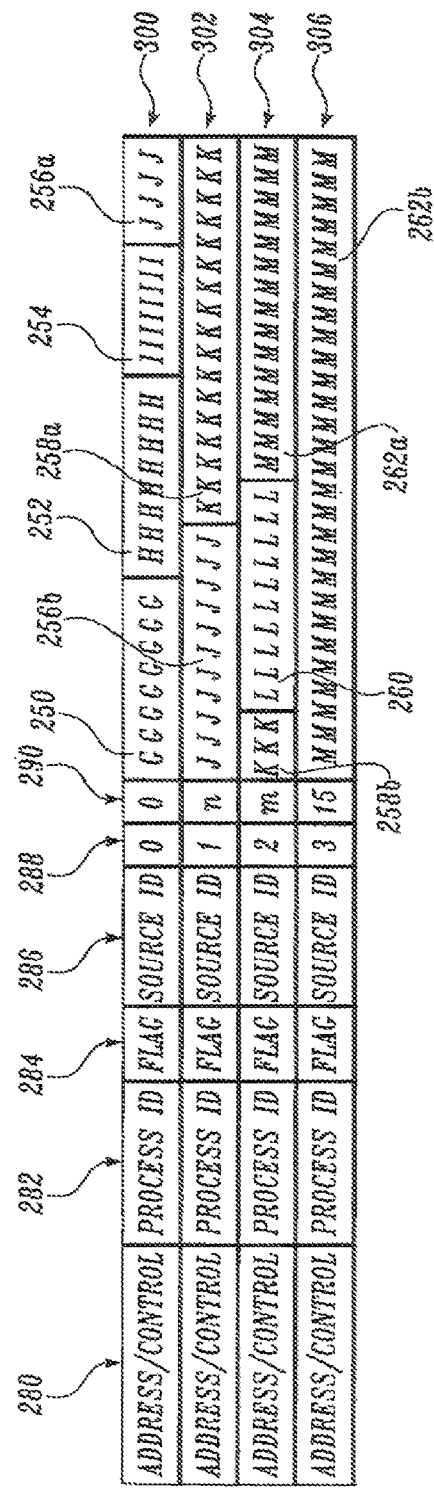

An example of a data transmission involving the above-referenced packing and unpacking procedure is shown in FIGS. 12-16. While a more detailed discussion of FIGS. 12-16 is provided later, a brief summary of a portion of FIGS. 12-13 is helpful at this point. In FIG. 12, seven secondary data packets 250, 252, 254, 256, 258, 260, and 262 are shown. In accordance with the present invention, these secondary data packets are packed, or recorded, into the payload of four primary data packets 300, 302, 304, and 306 shown in FIG. 13.

In particular, secondary data packets 250, 252, and 254 are packed in their entirety in the payload of the first primary data packet 300. Because the number of bits remaining in the payload of primary packet 300 will not accommodate all of secondary data packet 256, rather than leaving that space unused, secondary data packet 256 is divided to define a "beginning" portion 256a that is packed into the first primary data packet 300. The remaining "end" portion 256b is carried over and packed into the second primary data packet 302. Subsequently, secondary data packet 258 is packed. However, because the secondary data packet 258 is longer than the number of bits remaining in the payload of primary packet 302, the secondary data packet 258 is divided into a "beginning" portion 258a and an "end" portion 258b that are packed into primary data packets 302 and 304, respectively. The same procedure is applied to secondary data packets 260 and 262, which are packed into primary data packets 304 and 306, as shown.

Although the principles of the present invention are applicable to data communication networks that transmit variable-length data packets, for purposes of discussion herein, the primary data packets have an overall fixed length. With fixed-length primary data packets, communication inefficiency arises if a portion of a primary packet payload remains unused instead of carrying actual data, such as secondary data packets. Communication efficiency is thus improved when the number of unused bits is minimized. As may be appreciated from the example given above, the data transmission method of the present invention includes packing multiple secondary data packets (and possibly a portion thereof) into a primary packet payload. Preferably, all of the bits in a primary packet payload are used in carrying data, such as secondary data packets.

An important term to be defined at this point is that of "first new secondary data packet." The first new secondary data packet in a primary packet payload is the first secondary data packet to have its beginning recorded in the primary packet payload. Hence, in reference to FIG. 13, secondary data packet 250 is the first new secondary data packet in primary data packet 300. Likewise, for primary data packets 302 and 304, the first new secondary data packets are secondary data packets 258 and 260, respectively.

Returning now to discuss the first packet offset 56 shown in FIG. 4, the first packet offset is a value that points to the location in a primary packet payload at which the first new secondary data packet is recorded. As will be more clearly explained later in reference to FIGS. 9-11, the first packet offset 56 allows a destination terminal to unpack secondary data packets packed in a primary packet payload even if one or more primary data packets transmitted by a source terminal have been lost, delayed, or received out of order.

As noted earlier, a connection between a source and a destination terminal must be established prior to transmission of data packets in the connection. Given the above description of the source identifier 52, sequence number 54, and first packet offset 56 included in the data packets, attention is now drawn to FIG. 5, which provides a functional flow diagram illustrating one procedure according to the present invention for establishing a connection between a source and a destination terminal. At a block 80, a source terminal transmits a connection request to a destination terminal. The connection request is sent in the form of one or more data packets. Preferably, a data packet with a connection request includes signaling for the destination terminal to recognize the packet as including a connection request. Such signaling may be provided by one or more bits in the data packet header.

In addition to requesting that a connection be established, a connection request preferably includes information specifying characteristics of the desired data transmission such as burst rates, expected amount of throughput, size of transmission bandwidth, estimated number of data packets to be transmitted, etc. The connection request may also identify any special processing required for the destination terminal to carry out the proposed data transmission. Such processing requirements may include, for example, jitter buffering, external signaling, etc.

At a block 82, the destination terminal receives and evaluates the connection request. In particular, the destination terminal evaluates its ability to handle the proposed data transmission if the requested connection is admitted. It is possible that the receiving terminal does not have the processing capacity to handle another connection, or at least to handle a new connection with a parameter (e.g., size of transmission bandwidth) specified in the connection request.

At a decision block 84, the destination terminal determines whether to admit the connection. To ensure that a source terminal does not wait indefinitely for a reply to a connection request, it is preferred that connection negotiation be deemed to automatically fail (i.e., connection refusal assumed) if the connection is not admitted by the destination terminal with a confirming reply received by the source terminal before expiration of a specified amount of time. If the destination terminal simply declines to admit the connection, at a block 86, the destination terminal transmits a connection refusal back to the source terminal.

Alternatively, at decision block 84, the destination terminal may determine that it cannot handle the connection as requested, but that it could handle one or more connections with modified connection parameters. For example, a source terminal may request a single high bandwidth connection. The destination terminal evaluating this request may find it is presently supporting a number of low bandwidth connections that have a uniform header configuration (e.g., to reduce implementation complexity). While the destination terminal may refuse the original connection request, the destination terminal may also elect to notify the source terminal that it could support several lower bandwidth connections in place of the requested high bandwidth connection. The connection refusal sent to the source terminal at block 86 may include such suggested modified parameters, if warranted.

At a block 88, the source terminal receives and evaluates the connection refusal. If the connection request is simply declined, without suggesting modified parameters, the source terminal may transmit a new connection request at block 80 to a different destination terminal. If no other appropriate destination terminal exists, the source terminal may inform the originator of the data transmission of the connection refusal.

In some circumstances, a source terminal may wait for a predetermined period of time and resend the connection request to the refusing destination terminal. It is possible that intervening changes in network traffic now permit the destination terminal to admit the connection, or at least suggest modified connection parameters for a possible connection.

If a connection refusal is accompanied by suggested modified parameters, at block 88 the source terminal may determine that a connection using the modified parameters is acceptable (i.e., the modified parameters still provide the source terminal with a connection that meets the source terminal's transmission needs). In that regard, the source terminal transmits a new connection request with the modified parameters at block 80 to the destination terminal. After evaluating the new connection request at block 82, the destination terminal may admit the connection at decision block 84. Those of ordinary skill in the art of data communication will appreciate that control of connection admission in this manner may also permit a destination terminal to exercise a "firewall" (i.e., authentication and authorization) function.

A number of objectives may be achieved through the connection negotiation process. For example, in some circumstances it is advantageous to communicate data in a compressed state. During connection negotiation, a source and destination terminal may identify and coordinate the compression and decompression schemes to be used for the connection.

Timing constraints associated with a data transmission may also be established through the connection negotiation process. For example, a connection request may include instructions to the destination terminal to delete received data if the data transmission takes more than a specified amount of time. In this manner, data that is "out-of-date" is eliminated.

In yet other circumstances, it may be desirable to set up a secure data transmission between a source and a destination terminal. The connection negotiation process allows the source and destination terminals to present and confirm authentication information with one another.

Figure 5:
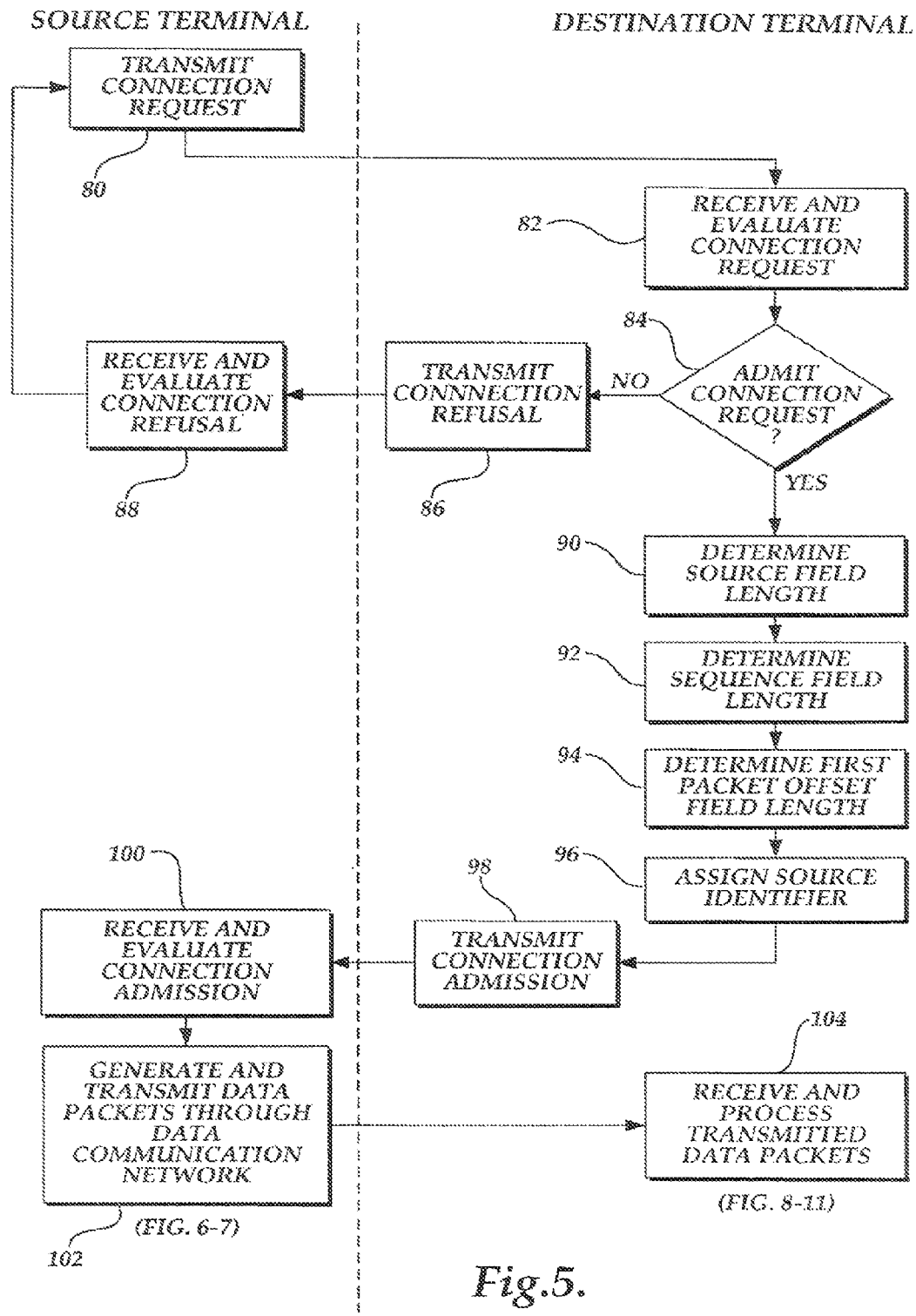
FIG. 5 is a functional flow diagram illustrating a connection negotiation and data transmission process performed in accordance with the present invention.

If, at decision block 84, the destination terminal decides to admit the requested connection, the destination terminal proceeds to determine field lengths (i.e., number of data bits) for a source identifier 52, sequence number 54, and first packet offset 56 to be included in data packets transmitted in the connection. As noted earlier in reference to FIG. 4, a variable number of bits are used for recording the source identifier 52, sequence number 54, and first packet offset 56. The variable length of these fields is indicated by dashed lines in FIG. 4. The remainder of the connection negotiation process shown in FIG. 5 illustrates a procedure used by the destination terminal to specify field lengths for the source identifier 52, sequence number 54, and first packet offset 56. The destination terminal also specifies the source identifier to be recorded in the source identifier field in each data packet.

In particular, at a block 90 in FIG. 5 the destination terminal determines a field length to be used for recording a source identifier. The length of the source identifier field is largely based on the number of connections that the destination terminal is handling or expects to handle. If the destination terminal is handling or expects to handle a large number of connections, a longer source identifier is required so that the destination terminal may uniquely identify each connection. Conversely, if a destination terminal is only handling a few connections, the source identifier may be shorter in length yet still be able to uniquely identify the connection.

One procedure for determining the source identifier field length uses a logarithm function. Specifically, a logarithm (base 2) of the number of connections yields the number of bits required for the source identifier field. For instance, if the destination terminal is handling or expects to handle 32 connections, log (base 2) of 32 yields a result of five; that is, the source identifier field should be at least five bits long.

Similarly, if the destination terminal is handling or expects to handle 1,024 connections, log (base 2) of 1,024 indicates that at least 10 bits will be needed for the source identifier field. To be conservative, any fractional result of the logarithm function should be rounded up. In addition, as a safety margin for an underestimated number of connections, it is suggested to add one or more bits to the outcome of the logarithm calculation.

In one embodiment of the invention, the destination terminal calculates the number of bits to be used for recording the source identifier at the time of connection negotiation. As noted above, this calculation is based on the number of connections the destination terminal is handling or expects to handle.

In an alternative embodiment of the invention, the destination terminal selects a field length for recording a source identifier from a set of predetermined values. The values in the set of predetermined values are based on the number of connections expected to be handled by the destination terminal. Different field length values may be selected by the destination terminal depending on different connection characteristics.

For instance, a network administrator reviewing the topology of the network, along with past connection statistics, may determine that, for a particular time of day, a destination terminal is likely to handle numerous connections and therefore to require a larger source identifier field. Likewise, the network administrator may determine that a shorter source identifier is sufficient for a different time of day with fewer expected connections. In this regard, the network administrator prepares a set of predetermined field lengths for the source identifier. During subsequent connection negotiations, the destination terminal selects a source identifier field length from the set of predetermined field lengths depending on the time of day that the connection is to be admitted.

The complexity of a data communication network implementing the present invention may be reduced by specifying a discrete set of field lengths from which the destination terminal may select. For example, one preferred embodiment of the invention uses a set of 6-, 14-, and 22-bit field lengths for a source identifier. If a calculation is performed at the time of connection negotiation, as discussed above, the result of the calculation is rounded up to the nearest field length value in the set of source identifier field lengths.

In addition to determining a field length for recording a source identifier, at a block 92 in FIG. 5 the destination terminal determines a field length for recording a sequence number. Because a sequence number identifies the relative position of a data packet in a series of data packets, a sequence number cannot be duplicated in another data packet in the same series of data packets. Thus, the length of the sequence number field primarily depends on the number of data packets estimated to be transmitted in a connection during a particular time period. In that regard, an estimated number of data packets may be obtained by evaluating the "time to live" of a data packet and the amount of bandwidth allocated to the connection. Alternatively, a source terminal may specify in a connection request a value that indicates an estimated number of data packets to be transmitted.

The "time to live" of a data packet is the maximum amount of time a data packet can spend in transmission, measured from the time when the routing of the data packet begins. Any data packet delayed longer than this time is assumed to have been lost in the network and is disregarded. During the "time to live" of a data packet, a certain number of data packets in a connection simultaneously exist in the network. Each of these packets needs a sequence number that unambiguously identifies the data packets positions.

Higher bandwidth connections generally involve transmission of larger volumes of data packets. Accordingly, a longer sequence number field that accommodates a larger set of sequence numbers is needed for the data packets expected to be transmitted. For lower bandwidth connections involving transmission of smaller volumes of data packets, a shorter sequence number field may be sufficient. Similar to the source identifier field, a destination terminal may either calculate a sequence number field length at the time of connection negotiation, or select the field length from a set of field lengths determined beforehand. If the latter is used, the field lengths in the set of field lengths are determined based on an estimated number of data packets to be transmitted in a connection during a particular time period.

One procedure for determining a number of bits for the sequence number field involves calculating a number of data packets to which a logarithm function is applied. The procedure determines the number of data packets from data packet "time to live" and connection bandwidth values. As an example, data packets having a length of 1,024 bits are transmitted at a rate of 2,048 megabits per second to a destination terminal. Furthermore, for this example, the "time to live" for a data packet is two seconds. Dividing 2,048 megabits per second by 1,024 bits per packet yields 2,000 packets per second. Thus, during the "time to live" of two seconds of a data packet, a sequence numbering for 4,000 packets should be maintained so that the sequence of the data packets can be accurately reconstructed at the destination terminal.

Applying a log (base 2) function to 4,000 sequence numbers indicates that at least twelve bits should be used for the sequence number field. To be conservative, one or more bits may be added to the calculated field length to cover for inaccuracies in the parameters used. Hence, a sequence number field of fourteen bits may be appropriate for the example described above.

If the destination terminal selects a sequence number field length from a predetermined set of values, the selection may be made based on the identity of the source terminal requesting the connection. For instance, a source terminal may be known for establishing only high bandwidth connections in which numerous data packets are sent. Accordingly, the predetermined set of values is set up so that, if a connection request is received from that source terminal, a larger sequence number field length is selected. Likewise, selection of a smaller sequence field length is made for connection requests originating from source terminals known to establish only small bandwidth connections with fewer transmitted data packets.

While the length of the source identifier and sequence number fields may vary from connection to connection, in many cases the number of bits needed for a source identifier varies inversely with the number of bits needed for recording sequence numbers. For example, a destination terminal may allocate its processing resources to only a few high bandwidth connections in which numerous data packets are sent. In that case, while only a few bits may be needed for source identifiers to uniquely identify the few connections, more bits are needed for recording, larger sequence numbers. On the other hand, a destination terminal may be managing numerous, low bandwidth connections in which a limited number of data packets are sent. In that case, more bits are needed to support the many unique source identifiers required, while fewer bits are required for smaller sequence numbers. Accordingly, in one embodiment of the invention, the combined number of bits reserved for recording a source identifier and a sequence number in a data packet header is held constant. With a constant combined number of bits, assigning a greater number of bits to the source identifier leaves fewer bits for the sequence number field, and vice versa. Keeping the combined number of bits constant for the source identifier and sequence number fields helps reduce implementation complexity as it sets up a more predictable length to the data packet header.

In another embodiment of the invention, both the source identifier and sequence number fields use a reduced number of bits. For example, if a destination terminal is supporting a small number of low bandwidth, low data rate connections, the destination terminal does not need numerous unique source identifiers or numerous sequence numbers to support the connections. The destination terminal may specify a reduced length for both the source identifier field and the sequence number field for a requested connection. For data packets having an overall fixed length, the extra, available bits resulting from smaller size source identifier and sequence number fields may be added to other fields in the packet, such as the first packet offset field or the payload. In this manner, the length of the first packet offset field, discussed below, may be determined based on the length of other fields in the data packet such as the source identifier and sequence number fields.

Continuing with the connection negotiation procedure illustrated in FIG. 5, at a block 94, the destination terminal determines a field length for recording a first packet offset. The number of bits assigned to the first packet offset field may be determined through negotiation, or may be preassigned depending on the source and destination terminals. If four bits are assigned to the first packet offset field, the first packet offset is a value in the range of decimal values 0-15 (binary values 0000-1111). Likewise, if five bits are assigned to the first packet offset field, the first packet offset is a value in the range of decimal values 0-31 (binary values 00000-11111). Although the number of bits designated for the first packet offset may vary from connection to connection, it is expected that the number of bits would range from four to six bits for the embodiments of the invention particularly discussed herein. However, as will be noted below, greater or fewer bits may be assigned to the first packet offset according to the data transmission needs of the data communication network.

In one embodiment of the invention, the lowest and highest values that a first packet offset may hold (i.e., decimal 0 and 15 for a four-bit value, 0 and 31 for a five-bit value, etc.) are reserved to indicate the following special situations. The intervening first packet offset values (i.e., 1-14 for a four-bit value, 1-30 for a five-bit value, etc.) are used to locate the beginning of the first new secondary data packet packed in a primary packet payload.

If the first packet offset holds the lowest value (i.e., decimal value 0 or binary value 0000 for a four-bit first packet offset), the first packet offset indicates that the first new secondary data packet in the primary packet payload begins at the first whole byte after the end of the primary packet header. For example, if the primary packet header occupies the first 71 bits of the primary data packet, the first new secondary data packet is recorded beginning at byte number 9 (i.e., bit number 72) of the primary data packet. If the primary packet header occupies the first 75 hits, for example, the first new secondary data packet begins at byte number 10 (i.e., bit number 80).

If the first packet offset 86 holds the highest value (i.e., decimal value 15 or binary value 1111 for a four-bit first packet offset), the first packet offset indicates that no new secondary data packet begins in the primary packet payload. In other words, all of the data recorded in the primary packet payload is a "middle" or an "end" portion of a secondary data packet having a "beginning" portion recorded in the payload of a prior primary data packet.

As for intervening first packet offset values (i.e., the first packet offset values in the range of decimal value 1-14 or binary value 0001-1110 for a four-bit first packet offset), the first packet offset is a value, preferably used in an equation, that indicates the byte number of the primary data packet at which the first new secondary data packet begins. For example, in circumstances where a primary packet header is 10 bytes long, a suitable equation is $10+8v$, where v is the decimal value of the first packet offset. Using this equation, if the first packet offset value is 3, for example, the indicated location of the first new secondary data packet recorded in the primary packet payload is at byte number 34, i.e., $10+8(3) =34$. Obviously, the above equation requires that secondary data packets be recorded beginning at locations measured in eight-byte intervals.

In the above-described embodiment of the invention, it is appreciated that a first new secondary data packet cannot begin on byte number 130 or later in a primary data packet (i.e., since $10+8(14)=122$, byte number 122 is the last byte of the primary data packet to which the first packet offset can point). However, as the first packet offset identifies only the location of the first new secondary data packet in the primary packet payload, a second or third new secondary data packet (e.g., secondary data packets 252, 254, and 262 in FIG. 13) can be recorded beginning at byte number 130 or later. Increasing the number of bits assigned to the first packet offset will permit larger first packet offset values that consequently permit the indication of a first new secondary data packet at a byte number greater than 122.

It is further appreciated that the embodiment of the invention described above is most efficient for secondary data packets with packet lengths that are multiples of eight bytes. When recording secondary data packets that do not align on eight-byte intervals in the primary packet payload, data bits between the end of one secondary data packet and the beginning of the next secondary data packet (which begins at the next eight-byte interval) remain unused. Secondary data packets may be more closely packed in a primary packet payload by increasing the number of bits in the first packet offset field. For example, four-byte intervals may be set with a five-bit first packet offset. In circumstances where a primary packet header is 10 bytes long, a suitable equation for a five-bit first packet offset and four-byte intervals is $10+4v$, where v is the decimal value of the first packet offset. Accordingly, the number of bits between intervals in a primary data packet may depend on the first packet offset field length.

Along with determining field lengths for the source identifier (block 90), sequence number (block 92), and first packet offset (block 94), at a block 96 in FIG. 5 the destination terminal selects and assigns a source identifier to the connection. The source terminal subsequently includes the assigned source identifier in the source identifier field of data packets it transmits in the connection. Of course, the length of the source identifier matches the length of the source identifier field determined by the destination terminal at block 90. In selecting a source identifier, the destination terminal considers the other connections it is presently handling and selects a unique identifier for the connection being established. The source identifier may be, for example, a randomly generated number or may be a number selected by the destination terminal from a set of predetermined source identifier numbers.

At a block 98, the destination terminal transmits a connection reply to the source terminal indicating that the connection has been admitted. The connection reply includes the determined field lengths for the source identifier, sequence number, and first packet offset, as well as the assigned source identifier. At a block 100, the source terminal receives and evaluates the connection reply. In that regard, the source terminal notes the determined field lengths and source identifier for use in transmitting data in the connection. At this point, the connection is considered established.

With an established connection, the source terminal proceeds at a block 102 to generate and transmit data packets through the data communication network to the destination terminal. As noted earlier, in one aspect of the present invention, the data transmitted through the network includes data packets received from an outside source that are formatted according to a transmission protocol different from the protocol of the data communication network (referred to herein as "secondary data packets"). In that regard, the "primary data packets" generated and transmitted by the source terminal at block 102 carry the secondary data packets through the data communication network. At a block 104, the destination terminal receives and processes the transmitted primary data packets. One procedure for generating and transmitting primary data packets carrying secondary data packets according to the invention is illustrated in greater detail in FIGS. 6 and 7. In FIGS. 8-11, one procedure for receiving and processing transmitted primary data packets carrying secondary data packets is shown.

Before transmitting data packets in a connection, a source terminal records the assigned source identifier in the source identifier field of each data packet. In addition, sequentially increasing (or decreasing) sequence numbers are assigned and recorded in the sequence number field of each successive data packet transmitted in the connection. Furthermore, as secondary data packets are recorded in the payload of primary data packets prior to transmission, a value is recorded in the first packet offset field to identify the location of the first new secondary data packet recorded therein.

Because the field lengths for the source identifier, sequence number, and first packet offset recorded in each data packet may differ from connection to connection, it is necessary that a destination terminal recognize the lengths of these fields upon receipt of a data packet so it can correctly process the data packet. For example, suppose a destination terminal is handling a first connection that uses a four-bit source identifier having the binary value 1001. Suppose further that the destination terminal subsequently admits a second connection using an eight-bit source identifier. Without an ability to discern the length of the source identifier in a data packet transmitted through the network, the destination terminal cannot assign a source identifier beginning with 1001 to the second connection or it will be ambiguous to the destination terminal whether a received data packet having a source identifier starting with 1001 pertains to the first or second connection. Consequently, the destination terminal must either avoid establishing source identifiers that overlap in initial bits, or transmitted packets must include information in the packets disclosing the length of the source identifier so the destination terminal can distinguish the connections to which the received packets pertain.

According to the invention, various means are available for configuring a packet to include information regarding the length of a field in the packet. For instance, certain bits in a packet header may be specially designated for indicating the length of one or more fields. The designated bits may be in a separate field, such as the process identifier field 46 (FIG. 4), or may be in the field of interest itself, typically at the beginning of the field. For example, the initial bits in a source identifier field 52 may be designated to identify the total number of bits in the source identifier. To reduce the number of bits required for recording field length information, the information may be appropriately encoded and decoded when needed.

Reducing the number of bits required for recording field length information may also be accomplished by using a data packet configuration wherein the source identifier, sequence number, and first packet offset are recorded in series in a single block of data bits. With a known location for the block of data bits and a constant number of bits in the block, designated bits in the data packet may be used to locate the partitioning between the fields in the block instead of indicating the actual field lengths. For example, in reference to the data packet illustrated in FIG. 4, the sequence number 54 is shown immediately following the source identifier 52. Specific bits may be designated in the packet header to locate the partition 58 (i.e., the hit number) where the source identifier 52 ends and the sequence number 54 begins. Likewise, designated bits in the packet header may be used to locate the partition 60 where the sequence number 54 ends and first packet offset 56 begins. Given this partition information and a known starting bit number for the source identifier 52, the field length of the source identifier 52 and the sequence number 54 are easily calculated. Furthermore, because the number of bits in all three fields is constant, given the length of the source identifier field 52 and the sequence number field 54, the length of the first packet offset field 56 is also easily determined.

In yet another embodiment of the invention, the destination terminal records the field length and/or partition information in a memory during the connection negotiation process. The field length and/or partition information is associated with the assigned source identifier. In this embodiment, data packets transmitted in the connection need only include information on the source identifier field length. Once the destination terminal identifies and recognizes the source identifier of a data packet received through the network, the destination terminal references the field length and/or partition information stored in memory to identify the sequence number and first packet offset recorded in the data packet.

As noted earlier, FIG. 6 is a flow diagram that illustrates one procedure according to the principles of the present invention for packing and transmitting secondary data packets formatted according to different transmission protocols. As indicated at a block 110, secondary data packets are received by a source terminal into a secondary packet send queue. The secondary packet send queue is preferably implemented in a memory within the source terminal. Once a connection with a desired destination terminal is established, at a block 112 the source terminal generates primary data packets and packs the secondary data packets in the secondary packet send queue into the payload of the generated primary data packets. One procedure for packing the secondary data packets is described in greater detail in reference to FIG. 7. Resulting from the packing procedure in FIG. 7 are primary data packets that carry the secondary data packets received by the source terminal.

Figure 6:
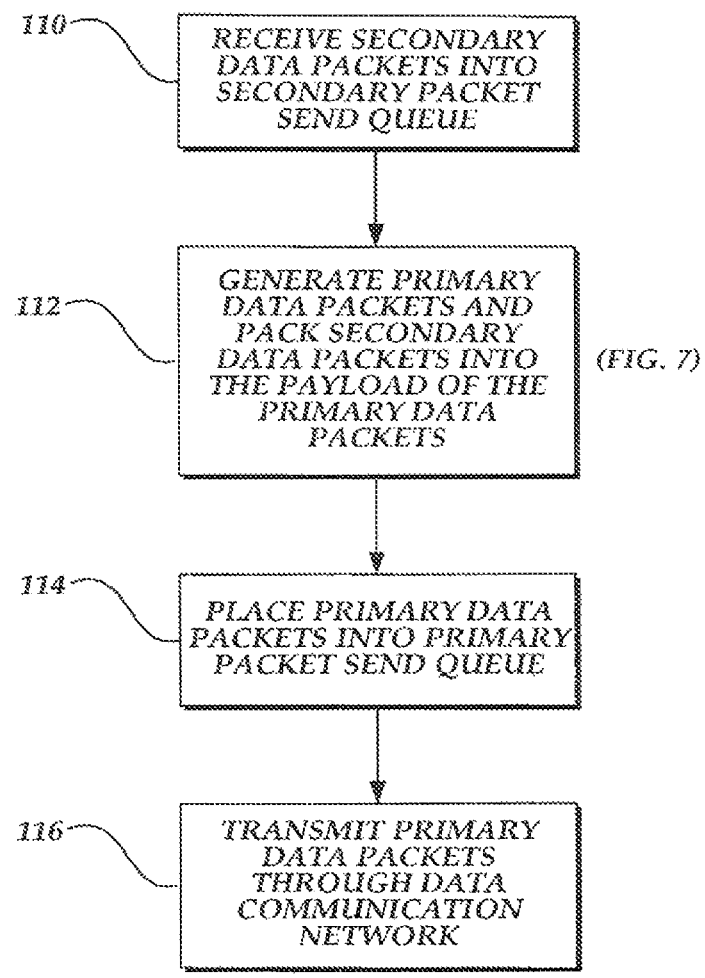
FIG. 6 is functional flow diagram of a packing and data transmission stage of a data transmission performed in accordance with the present invention.

At a block 114 in FIG. 6, the primary data packets are placed into a primary packet send queue. The primary packet send queue is also preferably maintained in a memory within the source terminal. At a block 116, the primary data packets in the primary packet send queue are transmitted through the data communication network to the destination terminal. Transmission of the data packets is performed in accordance with the transmission protocol of the data communication network.

Figure 7:
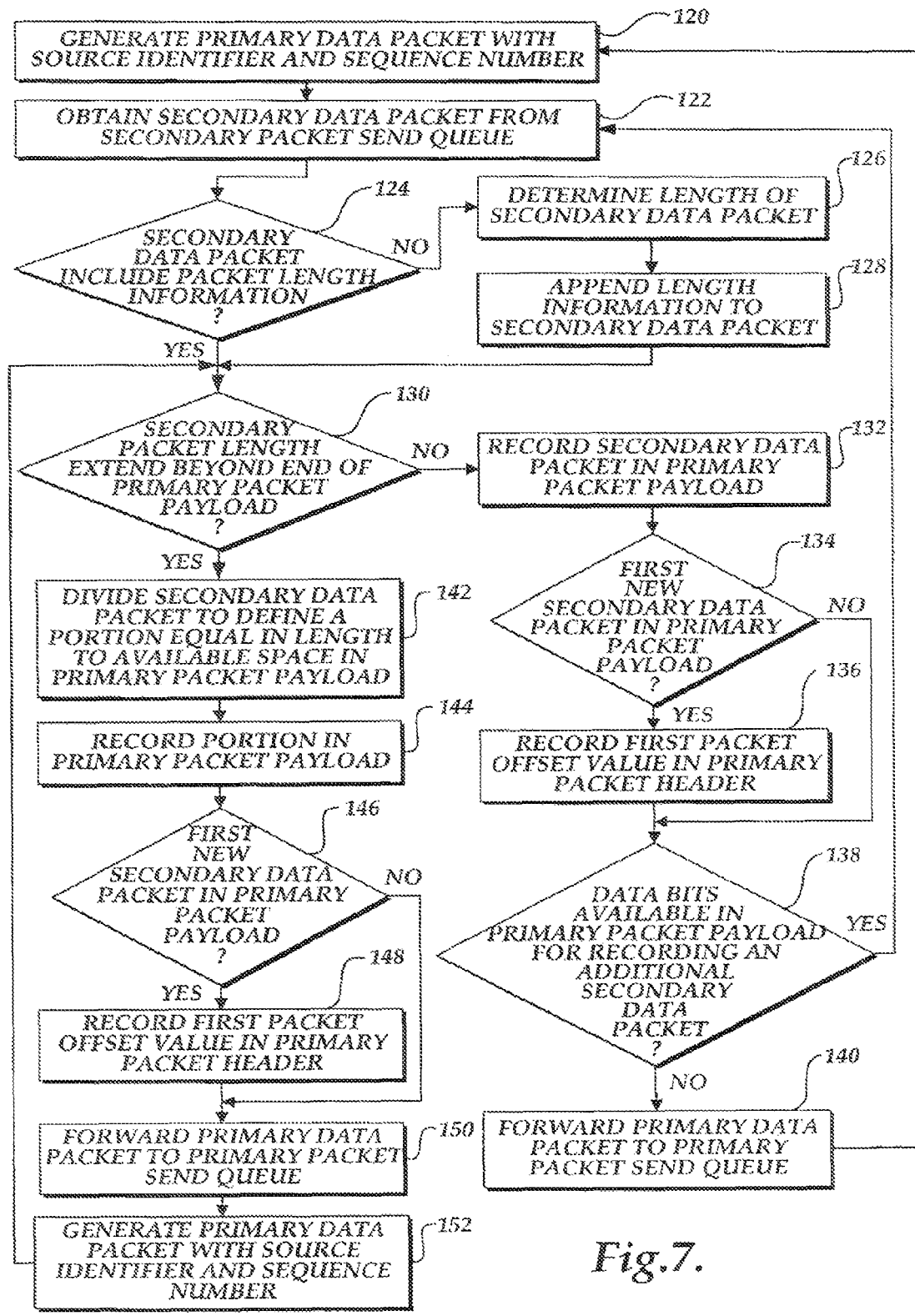
FIG. 7 is a functional flow diagram of one procedure for packing secondary data packets into primary data packets as indicated by the packing stage shown in FIG. 6.

Referring now to FIG. 7, the packing procedure begins at a block 120 wherein primary data packets are generated by the source terminal with a source identifier and a sequence number recorded in their respective fields. The source terminal records the source identifier previously assigned by the destination terminal in the connection negotiation process. The sequence numbers assigned to the primary data packets are incremented (or decremented) for each successive primary data packet generated and transmitted in the connection. When the sequence number to be assigned to a data packet reaches the maximum (or minimum) permitted by the number of bits in the sequence number, the sequence numbering "wraps around" and the next primary data packet receives the lowest (or highest) sequence number permitted.

At a block 122, the source terminal obtains a secondary data packet from the secondary packet send queue. In that regard, the source terminal may copy a secondary data packet from the secondary packet send queue into a buffer for processing and packing into a primary data packet. Alternatively, a source terminal may "obtain" a secondary data packet by simply referencing the location of a secondary packet in the secondary packet send queue.

At a decision block 124, the source terminal inspects the secondary data packet to determine whether the packet includes information on its packet length. If the secondary data packet does not include information on its own length, at a block 126 the source terminal determines the length of the secondary data packet and at a block 128 prepends the length information to the secondary data packet.

At a decision block 130 the source terminal inspects the packet length information of the secondary data packet to determine whether the number of bits in the secondary data packet extends beyond the end of the primary packet payload in which the secondary packet is to be recorded (i.e., whether the number of bits in the secondary data packet to be recorded exceeds the number of available bits in the primary packet payload). If, at decision block 130, it is determined that the number of bits in the secondary data packet does not exceed the number of available bits in the primary packet payload, at a block 132 the secondary data packet is recorded in its entirety in the primary packet payload.

After recording the secondary data packet in the primary packet payload, at a decision block 134 the source terminal determines whether the recorded secondary data packet is the first new secondary data packet to be recorded in the primary packet payload. If so, at a block 136 the source terminal records a value in the first packet offset field of the primary data packet that identifies the location of the secondary data packet.

At a decision block 138 the source terminal evaluates whether additional data bits are available in the primary packet payload for recording an additional secondary data packet or a portion thereof. In that regard, the source terminal may inspect the primary packet payload to see if the next interval at which a secondary data packet could be packed (dictated by the first packet offset equation as noted earlier) exists within the bounds of the primary data packet payload. If the source terminal determines that data bits remain available, the source terminal proceeds to obtain another secondary data packet from the secondary packet send queue as indicated at block 122. The process for packing a secondary data packet as described above is repeated.

If, at decision block 138, the source terminal determines that no data bits remain available for recording an additional secondary data packet, at a block 140 the source terminal forwards the primary data packet to a primary packet send queue for transmission through the data communication network. The source terminal then returns to generating another primary data packet with a recorded source identifier and a sequence number, as indicated at block 120. The process shown in FIG. 7 for packing the secondary data packets in the generated primary data packet is repeated for all of the secondary data packets in the secondary packet send queue.

Returning to decision block 130, in the event that a secondary data packet to be packed in a primary data packet exceeds the number of bits available in the primary packet payload, at a block 142 the secondary data packet is divided to define a first portion equal in length to the available space in the primary packet payload. At a block 144, the defined first portion of the secondary data packet is recorded in the available data bits in the primary packet payload. At a decision block 146, the source terminal determines whether the portion recorded is the beginning of the first new secondary data packet to be recorded in the primary packet payload. If so, at a block 148 the source terminal records a value in the first packet offset field to identify the location at which the portion is recorded. Because the recorded portion fills up the remaining space in the primary packet payload, at a block 150 the source terminal forwards the primary data packet to a primary packet send queue for transmission through the data communication network.

The remaining, second portion of the secondary data packet not yet recorded remains in memory in the source terminal. At a block 152, the source terminal generates another primary data packet for recording the portion of the secondary data packet remaining in memory. Returning to decision block 130, the source terminal determines whether the number of bits in the secondary data packet (or, in this case the remaining portion thereof) extends beyond the end of the primary packet payload. If the number of bits in the remaining portion of the secondary data packet does not exceed the number of available bits in the primary packet payload, at block 132 the remaining portion of the secondary data packet is recorded in its entirety in the primary packet payload. The procedure following block 132 is continued as earlier described. However, because the remaining portion of the secondary data packet is an "end" portion; it cannot be the first new secondary packet to be recorded in the primary packet payload. Thus, at decision block 134, the source terminal proceeds to decision block 138 to determine whether additional data bits are available in the primary packet payload for recording an additional secondary data packet.

If, at decision block 130, the source terminal determines that the remaining portion of the secondary data packet does extend beyond the end of the primary packet payload, the remaining portion is again divided to define a portion equal in length to the available space in the primary packet payload. At block 144 this defined portion of the secondary data packet is recorded in the available data bits in the primary packet payload. Since the defined portion represents a "middle" portion of the secondary data packet, it cannot be designated the first new secondary data packet in the primary packet payload. Thus, at decision block 146, the procedure proceeds to block 150 where the primary data packet is forwarded to the primary packet send queue for transmission through the data communication network. At that point, at block 152, another primary data packet is generated and the packing process beginning at decision block 130 is repeated until all of the remaining portion of the secondary data packet is recorded in a primary packet payload.

Figure 8:
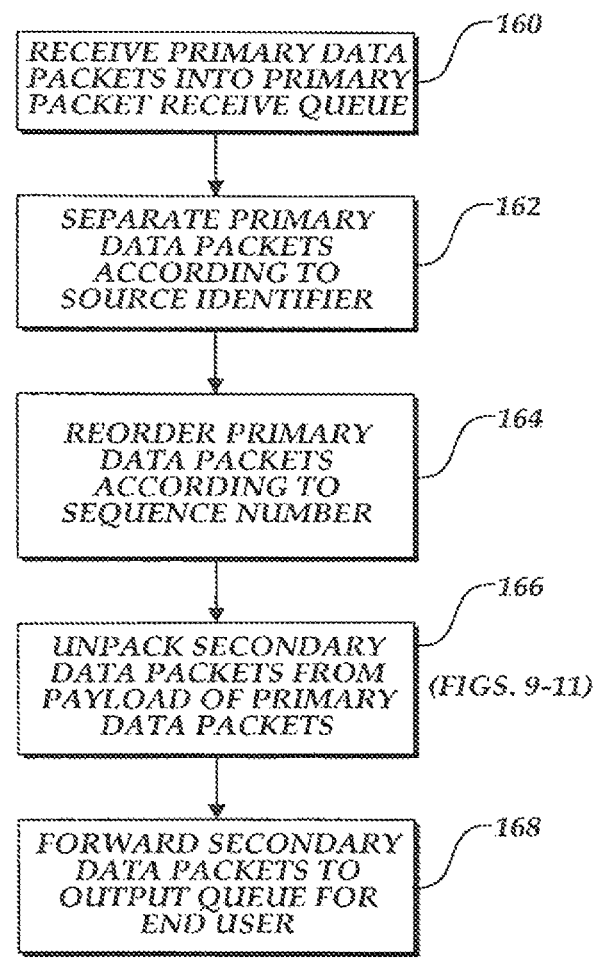
FIG. 8 is a functional flow diagram of a receiving and unpacking stage of a data transmission performed in accordance with the present invention.

As noted earlier, at block 116 in FIG. 6, primary data packets in the primary packet send queue are transmitted through the data communication network to the desired destination terminal. Turning now to FIG. 8, at a block 160 the transmitted primary data packets are received by the destination terminal into a primary packet receive queue. Preferably, the primary packet receive queue is implemented in a memory in the destination terminal.

Either at the time primary data packets are received at a destination terminal, or at a time subsequent, the destination terminal separates the received primary data packets according to the source identifier recorded in the primary data packets. Although separating the primary data packets may be accomplished by directing the received data packets into separate allocated sections of memory, the process of separating the data packets may also be accomplished by simply distinguishing and separately processing the different data packets according to their source identifier.

For data packets having the same source identifier, at a block 164 the destination terminal reorders the primary data packets according to their respective sequence numbers (if packet reordering is required either by the transmission protocol of the secondary data packets or by the data communication network needing to unpack a secondary data packet that spans several primary data packets). While reordering may be accomplished by allocating a separate memory space and copying the primary data packets in proper order into that memory space, reordering may also be accomplished by creating a linked list or other reference that readily sets forth the correct order of the primary data packets.

At a block 166, the packed secondary data packets are unpacked and, at a block 168, forwarded to an output queue. In one embodiment of the invention, unpacking includes copying the secondary data packets from the primary data packets to the output queue. The output queue is preferably implemented in a memory within the destination terminal. One process for unpacking secondary data packets, as indicated at block 166, is described in greater detail in reference to FIGS. 9-11.

It should be noted that the procedure of separating the primary data packets according to source identifier (block 162), reordering the primary data packets according to their sequence number (block 164), and unpacking the secondary data packets from the primary data packets (block 166) may be performed while the transmission of primary data packets in the connection is ongoing. This procedure may proceed continuously and act on each primary packet as it is received, or may wait for a group of data packets to be received before proceeding. Furthermore, as data packets travel independently through the data communication network, it is possible that one or more data packets will be lost or delayed in transmission. Accordingly, as will be better understood by the discussion below, provisions are made in the unpacking procedure to act on primary data packets received out of order.

Figure 9:
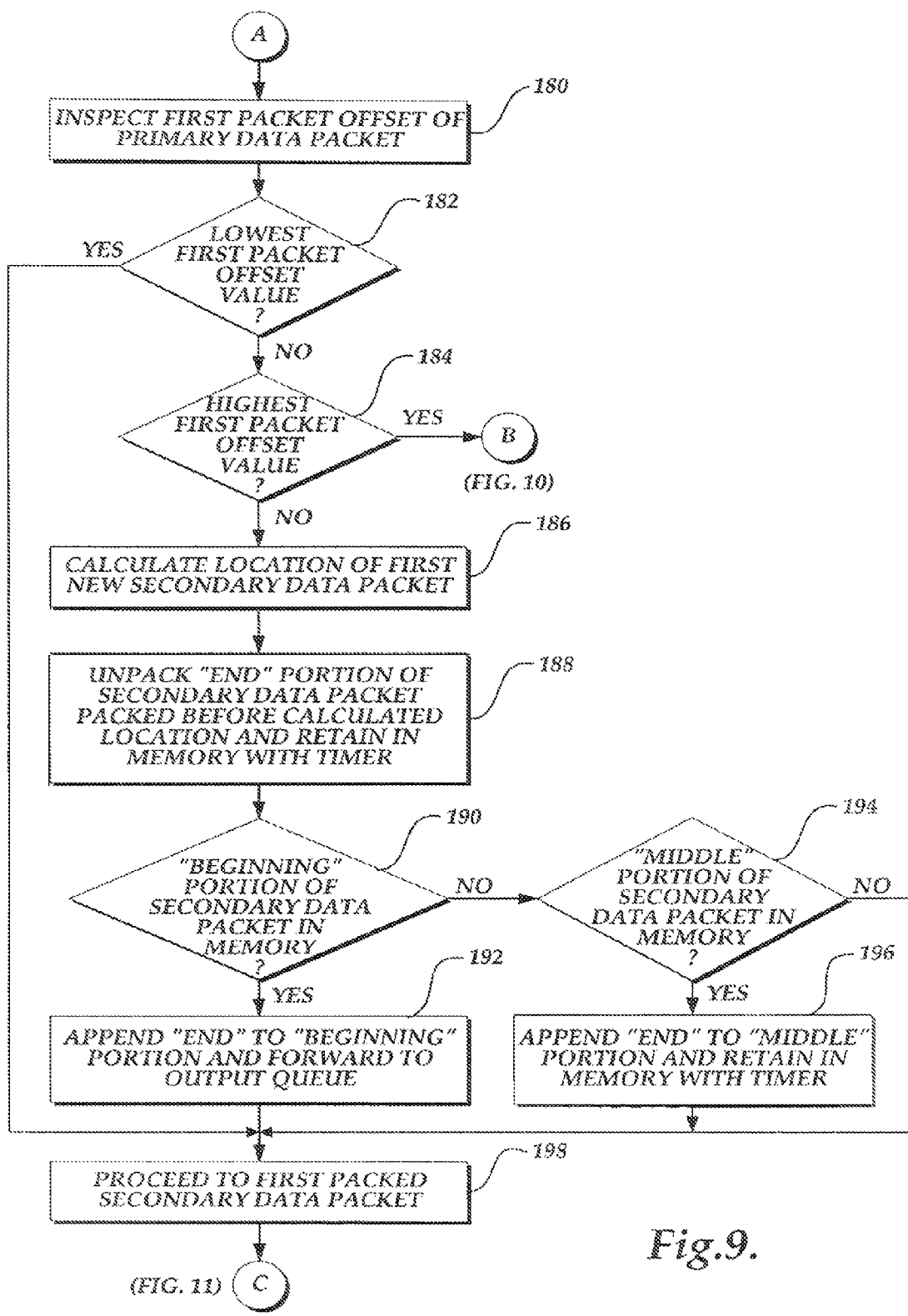
FIGS. 9-11 are functional flow diagrams of one procedure for unpacking secondary data packets from primary data packets as indicated by the unpacking stage shown in FIG. 8.
Figure 10:
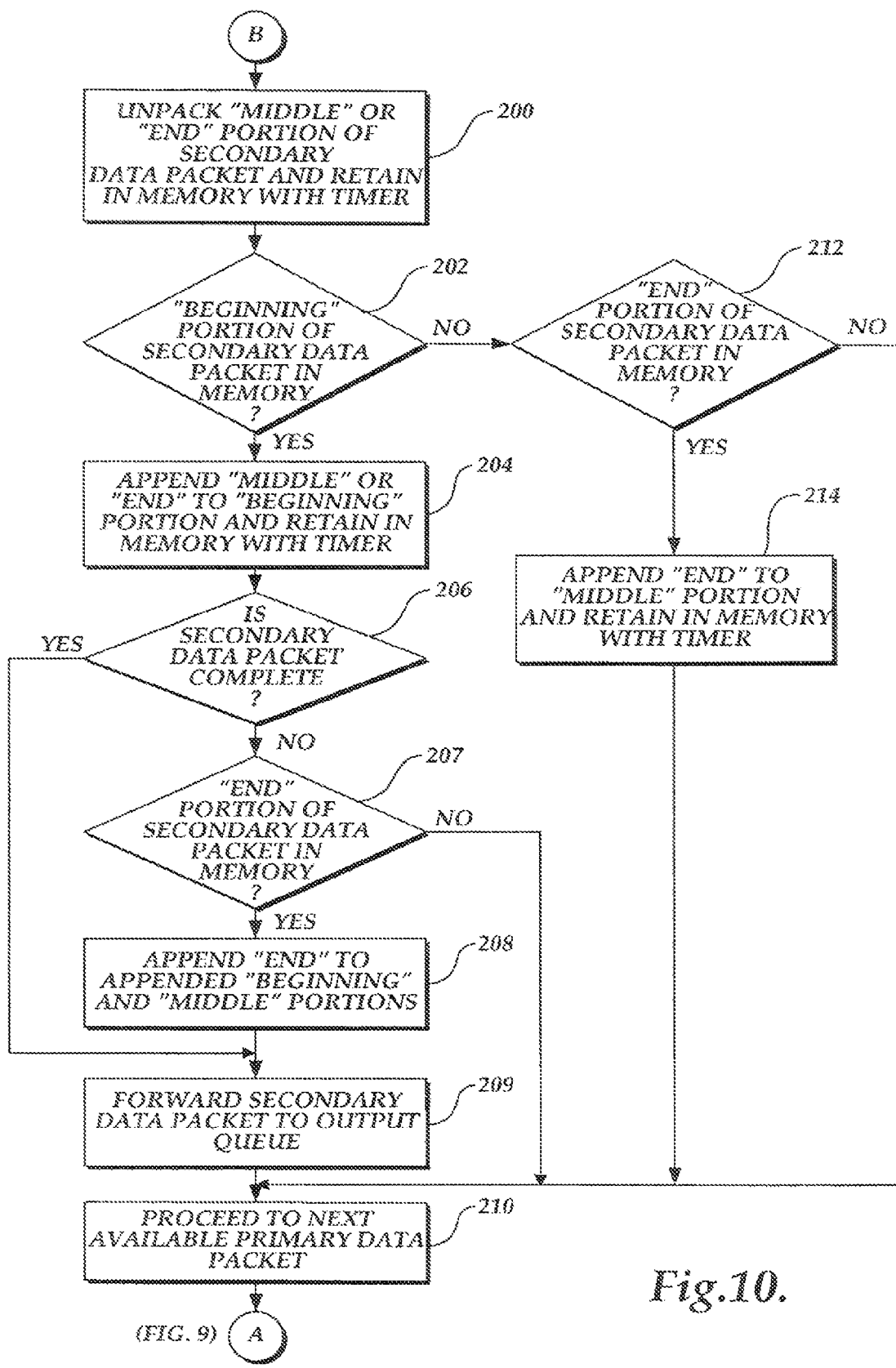
Figure 11:
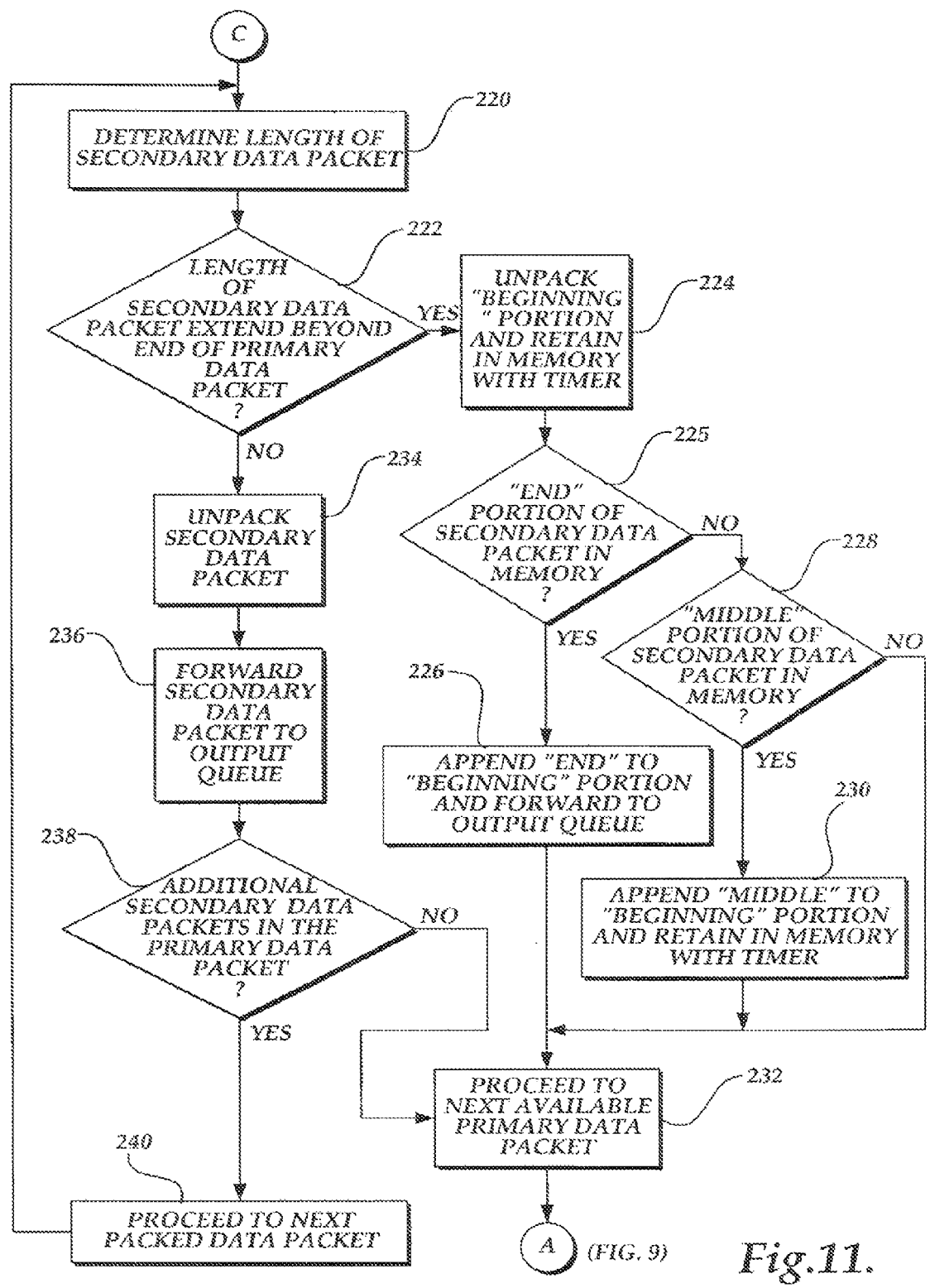

The unpacking procedure illustrated in FIGS. 9-11 begins at a point A in FIG. 9. At a block 180, the destination terminal inspects the value recorded in the first packet offset field of the primary data packet. At a decision block 182, the destination terminal determines whether the first packet offset value is the lowest value that the first packet offset may hold (e.g., decimal value 0 or binary value 0000 for a four-bit packet offset). As noted earlier, in one embodiment of the invention, a lowest first packet offset value indicates that the first new secondary data packet in the primary packet payload begins at the first whole byte after the end of the primary packet header. If the first packet offset holds this lowest value, the unpacking procedure proceeds at a block 198 to the first packed secondary data packet in the primary packet payload. At this point, the unpacking procedure continues at a point C in FIG. 11.

If, at decision block 182, the destination terminal determines that the first packet offset does not hold the lowest value that it may hold, the destination terminal proceeds at a decision block 184 to determine whether the first packet offset holds the highest value it may hold. If the first packet offset holds the highest value (e.g., decimal value 15 or binary value 1111 for a four-bit first packet offset), the first packet offset indicates that no new secondary data packet begins in the primary packet payload. If that is the case, the unpacking procedure continues at a point B in FIG. 10. Otherwise, at a block 186 the destination terminal uses the first packet offset value to calculate the location of the first new secondary data packet in the primary packet payload.

As noted earlier, in one embodiment of the invention, intervening first packet offset values between the lowest and highest value (e.g., decimal values 1-14 or binary values 0001-1110 for a four-bit first packet offset) indicate where the first new secondary data packet is packed in the primary packet payload. Preferably, the first packet offset in this regard is used in an equation to indicate the byte number at which the first new secondary data packet is recorded.

Because intervening first packet offset values indicate that the first new secondary data packet begins at some point other than the first byte after the primary packet header, it follows that there must be an "end" portion of a secondary data packet carried over from a prior primary data packet that is recorded in the bits between the primary packet header and the location indicated by the first packet offset. At a block 188, this "end" portion is unpacked and placed in a memory so that it may be matched up and appended to its corresponding "beginning" portion that was packed in a prior primary packet payload. Corresponding portions of a secondary data packet retained in memory may be matched up by reference to the source identifier and sequence numbers recorded in the primary data packets that delivered the secondary data packet portions.

Preferably, when the unpacked "end" portion is placed in memory, a timer mechanism is associated with the "end" portion. The timer mechanism may be a simple countdown register or may be a time reference that can be compared to a system clock. Upon expiration of a predetermined period of time counted by the timer, if the "end" portion is not matched up with its corresponding "beginning" portion and forwarded to an output queue, the "end" portion is deleted from the memory as out-of-date data. In this regard, the timer mechanism assists in maintaining only current data and avoiding situations wherein portions of data packets are retained in memory indefinitely.

At a decision block 190, the destination terminal evaluates whether a "beginning" portion of a secondary data packet corresponding to the unpacked "end" portion has already been previously unpacked and placed in memory. If the destination terminal discovers that a corresponding "beginning" portion exists in memory, at a block 192 the destination terminal appends the unpacked "end" to the "beginning" portion to form a complete secondary data packet and forwards the secondary packet to an output queue.

If, at decision block 190, the destination terminal does not find the corresponding "beginning" portion in memory, at a decision block 194 the destination terminal evaluates whether a "middle" portion corresponding to the unpacked "end" portion has been previously received, unpacked, and placed in memory. If a corresponding "middle" portion exists in memory, at a block 196 the unpacked "end" portion is appended to the "middle" portion to form a new "end" portion that is retained in memory with a reset timer mechanism. If a "middle" portion corresponding to the "end" portion is not found in memory, the destination terminal proceeds at block 198 to the location of the first new secondary data packet identified by the first packet offset, and continues the unpacking procedure at point C in FIG. 11.

Returning to decision block 184, if the destination terminal finds that the primary data packet has a first packet offset value that is the highest value it may hold, the first packet offset value indicates that no new secondary data packet is packed in the primary packet payload. In other words, the entire primary packet payload carries a "middle" or "end" portion of a secondary data packet of which the "beginning" portion is packed in a prior primary packet payload. The unpacking procedure for unpacking the "middle" or "end" portion continues at point B in FIG. 10.

Turning now to point B in FIG. 10, at a block 200 the destination terminal unpacks the secondary data packet "middle" or "end" portion and retains it in a memory with a timer mechanism. At a decision block 202, the destination terminal determines whether a corresponding "beginning" portion has already been received and unpacked. If the corresponding "beginning" portion is found in the memory, at a block 204 the unpacked "middle" or "end" portion is appended to the "beginning" portion.

In this embodiment of the invention, it is presumed that the destination terminal does not know whether the unpacked portion is a "middle" or an "end" portion until the "beginning" portion with packet length information is received and unpacked. Once the "middle" or "end" portion is appended to a corresponding "beginning" portion at block 204, at a block 206 the destination terminal uses the packet length information in the "beginning" portion to determine whether the appended portions form a complete secondary data packet. If a complete secondary data packet is formed, at a block 209 the secondary data packet is forwarded to an output queue.

If, at decision block 206, the destination terminal determines that a complete secondary data packet was not formed (i.e., that the unpacked portion was a "middle" portion rather than an "end" portion), the portions appended at block 204 are retained in memory as a new "beginning" portion with a reset timer.

Subsequently, at a decision block 207, the destination terminal determines whether a corresponding "end" portion has already been received and unpacked. If a corresponding "end" portion is found in the memory, at a block 208 the "end" portion is appended to the newly formed "beginning" portion (i.e., the portions appended at block 204). At this point, the secondary data packet is complete and, at block 209, is forwarded to an output queue. If, at decision block 207, an "end" portion is not found in memory, the newly formed "beginning" portion stays in the memory with a running timer and waits for the corresponding "end" portion to arrive and be unpacked.

In any event, at a block 210 the destination terminal proceeds to the next available primary data packet in the primary packet receive queue. The unpacking procedure then returns to point A in FIG. 9 to commence unpacking the secondary data packets in the primary data packet payload.

Returning to decision block 202, if the destination terminal does not find the "beginning" portion that corresponds to the unpacked "middle" or "end" portion, the destination terminal proceeds to decision block 212 where it determines whether a corresponding "end" portion has already been received and retained in memory. Obviously, if the unpacked portion is already an "end" portion, a negative answer will result at decision block 212. If, however, a corresponding "end" portion is found in memory, at a block 214 the destination terminal appends the "end" portion to the unpacked "middle" portion to form a new "end" portion that is retained in memory with a newly reset timer. In either regard, the destination terminal then proceeds at block 210 to the next available primary data packet in the primary packet receive queue and continues the unpacking procedure at point A in FIG. 9.

Turning now to point C in FIG. 11, the destination terminal begins the process of unpacking the first new secondary data packet and any subsequent secondary data packets packed into the primary packet payload. At a block 220, the destination terminal inspects the secondary data packet to be unpacked to determine its length. As noted earlier in reference to blocks 124, 126, and 128 in FIG. 7, the source terminal prepends length information to a secondary data packet if the secondary data packet does not already include information on its packet length. At a decision block 222 in FIG. 11, the destination terminal determines whether the length of the secondary data packet extends beyond the end of the primary packet payload. If so, the data packed in the primary packet payload is a "beginning" portion of the secondary data packet. At a block 224, the destination terminal unpacks the "beginning" portion and retains it in memory with a timer.

After unpacking the "beginning" portion, at a block 225 the destination terminal determines whether an "end" portion of a secondary data packet that corresponds to the unpacked "beginning" portion has already been received and unpacked into memory. If the corresponding "end" portion is found, at a block 226 the destination terminal appends the "end" portion to the "beginning" portion, thus completing the secondary data packet. The secondary data packet is then forwarded to an output queue.

If, at decision block 225, a corresponding "end" portion is not found in the memory, at decision block 228 the destination terminal determines whether a "middle" portion corresponding to the unpacked "beginning" portion has already been received and unpacked into the memory. If a corresponding "middle" portion is found, at a block 230 the "middle" portion is appended to the unpacked "beginning" portion to form a new "beginning" portion that is retained in memory with a newly reset timer.

Regardless of whether a corresponding "end" or "middle" portion is found in the memory, at a block 232 the destination terminal proceeds to the next available primary data packet in the primary packet receive queue. The unpacking procedure then returns to point A in FIG. 9 to continue unpacking secondary data packets.

Returning to decision block 222, if the length of the secondary data packet to be unpacked does not extend beyond the end of the primary packet payload, at a block 234 the destination terminal unpacks the secondary data packet in its entirety. At a block 236, the destination terminal forwards the unpacked secondary data packet to an output queue.

At a decision block 238, the destination terminal determines whether additional secondary data packets are packed in the primary packet payload. In one embodiment of the invention, this determination is performed by inspecting the location in the primary packet payload where the next secondary data packet could be packed (e.g., at the location indicated by the first packet offset or the location of the next interval at which another secondary data packet could be recorded). If an empty "null" character is found at that location, the destination terminal assumes that no additional secondary data packets are packed in the primary packet payload. If an additional secondary data packet is found packed in the primary packet payload, at a block 240 the destination terminal proceeds to the next packed secondary data packet and returns to block 220 to repeat the unpacking procedure. If, at decision block 238, an additional secondary data packet is not found in the primary packet payload, the unpacking operation is complete and the primary data packet is discarded. At block 232 the destination terminal then proceeds to the next available primary data packet in the primary packet receive queue. The unpacking procedure returns to point A in FIG. 9 to commence unpacking the secondary data packets packed in the primary data packet.

Turning now to FIGS. 12 through 16, a working example of a data transmission performed in accordance with the present invention is illustrated. In particular, FIG. 12 illustrates a stream of data consisting of seven secondary data packets having different packet lengths. The first secondary data packet 250 is illustrated by a series of eight letter "G's". The second secondary data packet 252 and the third secondary data packet 254 are illustrated by a series of eight letter "H's" and "I's", respectively. The fourth secondary data packet 256 is shown by fifteen "J's" while the fifth secondary data packet 258 is shown by twenty "K's". Finally, the sixth secondary data packet 260 is illustrated by a series of ten "L's" and the seventh secondary data packet 262 is shown by forty-three "M's". In accordance with the present invention, the seven secondary data packets illustrated in FIG. 12 are received by a source terminal into a secondary packet send queue in the memory of the source terminal. Before proceeding to pack the secondary data packets into the payload of one or more primary data packets for transmission through the data communication network, the source terminal ensures that each of the secondary data packets includes information on its packet length.

According to the present invention, the source terminal packs, or records, the seven secondary data packets illustrated in FIG. 12 into four primary data packets as illustrated in FIG. 13. The four primary data packets 300, 302, 304, and 306 include address and control information 280, process identifier information 282, and flag information 284. The four primary data packets also include source identifiers 286, sequence numbers 288, and first packet offset values 290. The information held in these fields is of the type described earlier in reference to the data packet configuration shown in FIG. 4.

The first secondary data packet 250 is packed into the payload of the first primary data packet 300. Because the first secondary data packet 250 is packed starting at the first byte following the header of the first primary data packet 300, the value "0" is entered into the first packet offset 290 of the primary data packet 300 (i.e., the lowest value the first packet offset may hold).

Furthermore, since packing the first secondary data packet 250 does not use all of the available bits in the payload of the first primary data packet 300, the second secondary data packet 252 is packed in the payload of the first primary data packet 300 beginning at the next eight-byte interval following the first packed secondary data packet 250 (assuming eight-byte intervals for the sake of this example). Similarly, the third secondary data packet 254 is packed in the payload of the first primary data packet 300 at the next eight-byte interval following the second packed data packet 252. For each of the secondary data packets 250, 252, and 254, the source terminal finds that the secondary data packets, as packed, would not extend beyond the end of the primary data packet. Thus, each of the secondary data packets 250, 252, and 254 is packed in its entirety in the payload of primary data packet 300.

After packing the third secondary data packet 254, an attempt is made to pack the fourth secondary data packet 256 into the payload of the primary data packet 300. However, in this representative example; the size of the fourth secondary data packet 256 exceeds the number of bits that remain available in the payload of primary data packet 300. According to the invention, the fourth secondary data packet 256 is therefore divided to define a beginning portion 256a, which is packed in the remaining bits of the first primary data packet 300.

The end portion 256b that was not packed into the first primary data packet 300 is packed into the payload of the second primary data packet 302. The second primary data packet 302 includes header information similar to that of the first primary data packet 300. However, in the second primary data packet 302, the sequence number 288 is incremented from 0 to 1 to indicate that the second primary data packet 302 is the next primary data packet in the sequence of primary data packets.

The fifth secondary data packet 258 is then packed into the payload of the second primary data packet 302 following the packed end portion 256b. Similar to the fourth secondary data packet 256, the fifth secondary data packet 258 exceeds the number of bits remaining available in the payload of the second primary data packet 302. A beginning portion 258a is therefore defined and packed into the second primary data packet 302, with the remaining end portion 258b being carried over and packed into the third primary data packet 304. Because the fifth secondary data packet 258 is the first new secondary data packet to be packed into the second primary data packet 302, a value "n" is recorded in the first packet offset field 290 of the second primary data packet 302, the letter "n" representing a value indicating the location at which the first byte of the fifth secondary data packet 258 (actually, beginning portion 258a) is recorded.

The packing procedure described above is similarly applied to the sixth 260 and seventh 262 secondary data packets. Specifically, the sixth secondary data packet 260 is packed into the payload of the third primary data packet 304 following the carried-over end portion 258b. A beginning portion 262a of the seventh secondary data packet 262 is also packed into the third primary data packet 304, filling the remaining available bits in the payload. The unrecorded end portion 262b is packed into the payload of the fourth primary data packet 306.

Since the sixth secondary data packet 260 is the first new secondary data packet packed in the third primary data packet 304, the header of third primary data packet 304 includes a value "m" in the first packet offset field 290, the letter "m" representing a value pointing to the location at which the first byte of the sixth secondary data packet 260 is recorded. The end portion 262h of the seventh secondary data packet 262 carried over from the third primary data packet 304 is shown completely filling the payload of the fourth primary data packet 306. Accordingly, in the first packet offset field 290 of the fourth primary data packet 306, the value "15" is recorded (i.e., the highest value the four-bit first packet offset may hold) to indicate that no new secondary data packet begins in the fourth primary packet payload.

The four primary data packets 300, 302, 304, and 306 include sequence numbers 288 to identify the order of the primary data packets. Specifically, the first primary data packet 300 has a sequence number of "0," the second primary data packet 302 has a sequence number of "1," the third primary data packet 304 has a sequence number of "2," and the fourth primary data packet 306 has a sequence number of "3." The four primary data packets 300, 302, 304, and 306 are placed in a primary packet send queue for transmission through the satellite network. As the transmission of each primary data packet through the satellite network is completed, the primary data packets are placed in a primary packet receive queue in a memory at the destination terminal. The destination terminal uses the source identifier 286 in each primary data packet to identify the connection to which the packet pertains.

Figure 14:
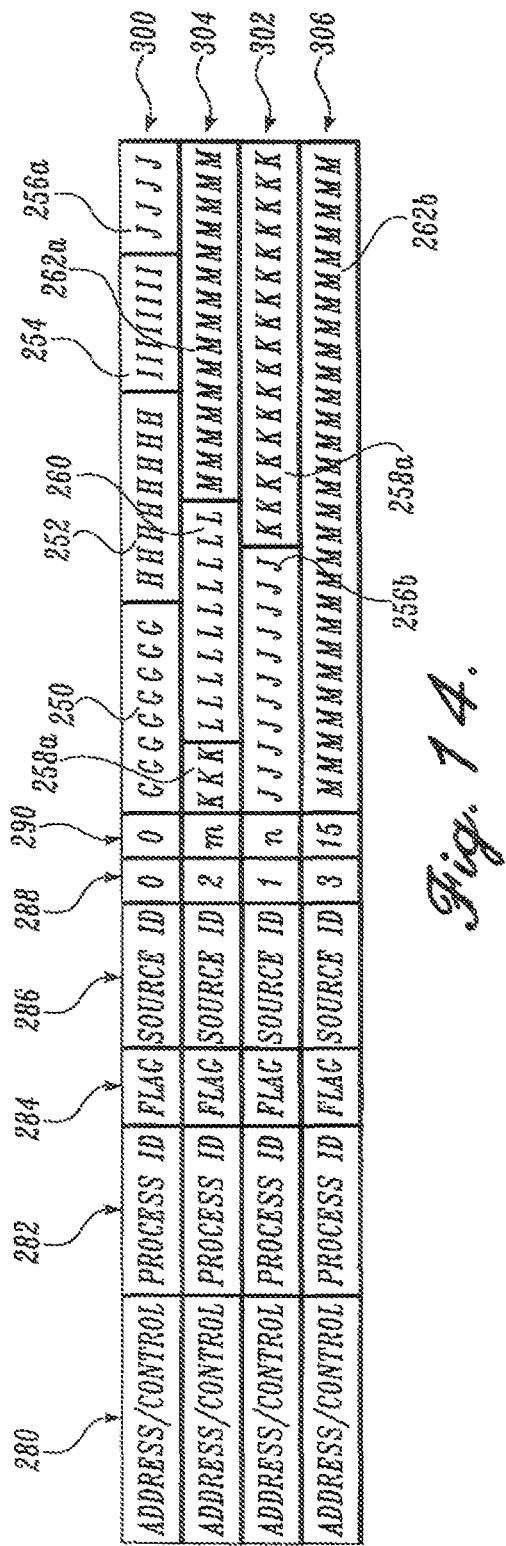

FIG. 14 illustrates an example of a primary packet receive queue having received the four primary data packets 300, 302, 304, and 306 after transmission through the data communication network. As indicated earlier, primary data packets may be transmitted through different routes in the data communication network and consequently may arrive at the destination terminal in a different order than they were sent. As illustrated in FIG. 14, while the first primary data packet 300 and the fourth primary data packet 306 are shown having been received in proper order, the second primary data packet 302 and the third primary data packet 304 are shown having been received out of order.

Figure 15:
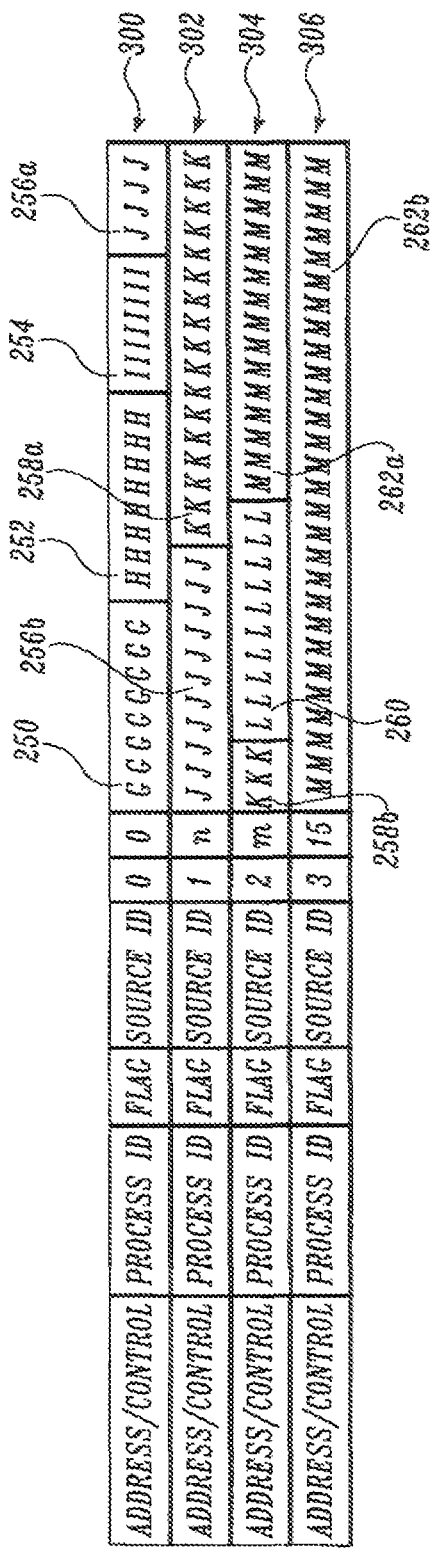

Assuming that packet reordering is required (which, in this example, is helpful because secondary data packets 256 and 258 both carry over from one primary data packet to the next), the primary data packets 300, 302, 304, and 306 are reordered before the secondary data packets are unpacked. The destination terminal inspects the sequence numbers 288 and reorders the primary data packets according to the sequence numbers. In the above example, the reordering operation reverses the order of the second primary data packet 302 and the third primary data packet 304 to produce a sequence of ordered primary data packets as shown in FIG. 15. Preferably, the reordering is performed in a memory or other buffer in the destination ground terminal.

Finally, an unpacking operation is used to unpack the secondary data packets. The destination terminal inspects the first packet offset field 290 of the first primary data packet 300 and finding the value "0," proceeds to the first byte after the header to unpack the first secondary data packet 250. The unpacking operation next unpacks the second secondary data packet 252 and the third secondary data packet 254 from the first primary data packet 300. From inspection of packet length information included in each secondary data packet, the unpacking operation understands that the first secondary data packet 250, second secondary data packet 252, and third secondary data packet 254 were wholly packed within the payload of the first primary data packet 300.

The unpacking operation next unpacks the beginning portion 256a of the fourth secondary data packet 256 from the first primary data packet 300. Recognizing that the length of the fourth secondary data packet 256 is greater than the number of bits remaining in the payload of the first primary data packet 300, the unpacking operation understands that the unpacked portion 256a is only a beginning portion of the fourth secondary data packet 256. The unpacking operation next unpacks the end portion 256b from the second primary packet payload 302 and appends the end portion 256b to the beginning portion 256a.

The fifth secondary data packet 258 is next unpacked from the payload of the second primary data packet 302. Again, similar to the manner in which the fourth secondary data packet 256 was unpacked, the unpacking operation recognizes that the length of the fifth secondary data packet 258 extends beyond the bits remaining in the payload of the second primary data packet 302. Accordingly, the unpacking operation unpacks and appends the beginning portion 258a and the end portion 258b from primary data packets 302 and 304, respectively. The sixth secondary data packet 260 and the seventh secondary data packet 262 are unpacked from the third primary data packet 304 and the fourth primary data packet 306 in the same manner described above.

Figure 16:
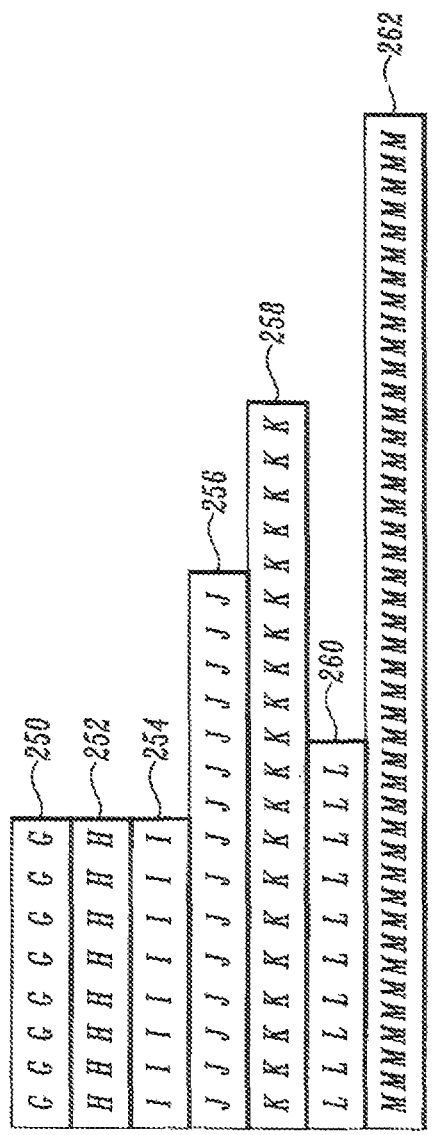

The resulting unpacked secondary data packets 250, 252, 254, 256, 258, 260, and 262 are placed into an output queue, as depicted in FIG. 16. If the seventh secondary data packet 262 had extended beyond the payload of the fourth primary data packet 306 into a fifth primary data packet, the output queue would preferably include only the first through the sixth secondary data packets. The portion of the seventh secondary data packet 262 received and unpacked would remain in the destination terminal memory until either the fifth primary data packet arrived with the corresponding end portion, or a predetermined period of time counted by a timer associated with the portion in memory expired.

According to the invention, the first packet offset field 290 of the primary data packets 300, 302, 304, and 306 provides a valuable advantage to the unpacking operation as it indicates the byte number at which the first new secondary data packet begins within the respective primary data packet payload. In instances where a primary data packet is lost or delayed, the unpacking operation can use the first packet offset values in the primary data packets received to continue unpacking secondary data packets. The unpacking operation uses the first packet offset value to skip over the bits of an end portion of a secondary data packet carried over from the missing primary data packet and unpack the secondary data packets that follow. Successfully unpacked secondary data packets are forwarded to the output queue. The end portion that was skipped over in the preceding example is unpacked and placed in memory to await the arrival of its corresponding beginning portion in the missing primary data packet. After the secondary data packets or portions thereof are unpacked from a primary data packet payload, the primary data packet is discarded.

As can be appreciated from the foregoing example, when in-order packet delivery is required, the secondary data packets are produced in the same order as received. If the secondary data packets originate under a transmission protocol (e.g., Internet Protocol) that does not guarantee in-order delivery of data packets, the original ordering of the secondary data packets does not need to be preserved. In that case, the unpacked secondary data packets are forwarded from the output queue to the end user without regard to packet order. From the perspective of the end user sending the data packets and the end user receiving the data packets, the intervening packing, transmission, and unpacking performed by the source and destination terminals remain largely unseen, with the possible exception of out-of-order packet delivery as noted.

While the preferred embodiment of the invention has been illustrated and described, it will be appreciated that various changes can be made therein without departing from the spirit and scope of the invention. For example, the data transmitted through the satellite communication network could include video or voice data. The invention is also suitable for use in data communication networks other than a LEO satellite data communication network of the type earlier described. Moreover, the description of the packing and unpacking operations that take place "at" or "in" the source and destination terminals is intended to include packing and unpacking performed by processing units not physically housed within the source or destination terminal as well. It is therefore intended that the scope of the invention be determined from the following claims and equivalents thereto.

The embodiments of the invention in which an exclusive property or privilege is claimed are defined as follows:

1. A method of data transmission in a data communication network, comprising:
   generating first and second network data packets formatted for transmission from a source terminal to a destination terminal in the data communication network, the network data packets each having a header and a payload, the header including a sequence number field and a first-packet offset field, said generating comprising:
   dividing a received input data packet having a header and payload, when a network data packet does not contain sufficient available payload length to transmit the received input data packet, into a first portion of a length less than or equal to the available payload length of the network data packet and a second portion containing the remainder of the input data packet; and
   packing the first portion into the payload of the first network data packet and the second portion in the payload of the second network data packet;
   recording a sequence number in the sequence number field, the sequence number identifying the relative position of the corresponding network data packet in a series of network data packets;
   recording a first-packet offset value in the first-packet offset field, the first-packet offset value identifying the location in the network data packet payload of a portion of the received input data packet that is packed in the network data packet payload when another portion of the received input packet has not been partially packed in a network data packet payload of a previous network data packet; and
   transmitting the network data packet from the source terminal to the destination terminal.

2. The method of claim 1, wherein said generating a network data packet includes:
   determining, prior to the dividing if the network data packet contains sufficient available payload length to transmit an input data packet.

3. The method of claim 2, further comprising:
   incorporating the second portion into one or more subsequent network data packets.

4. The method of claim 1, wherein the predetermined first-packet offset field length is determined during a connection negotiation conducted between the source terminal and the destination terminal.

5. A method of data transmission from a source terminal to a destination terminal in a data communication network, the method comprising:
   generating a network data packet having a header and a payload;
   packing one or more input data packets to the source terminal in the payload of the network data packet until the number of bits remaining available in the network data packet payload is less than the number of bits in an input data packet not yet packed;
   dividing the input data packet not yet packed to define a first portion and a second portion, wherein the number of bits in the first portion equals the number of bits remaining available in the network data packet payload;
   packing the first portion in the network data packet payload;
   generating one or more additional network data packets;
   packing the second portion in the payload of the one or more additional network data packets, dividing the second portion as necessary to fit into additional portions less than or equal to the length of the payload of the one or more additional network data packets; and transmitting the network data packets from the source terminal to the destination terminal via the data communication network.

6. A method of data transmission in a data communication network, comprising:

generating a network data packet for transmission from a source terminal to a destination terminal in the data communication network, the network data packet including one or more input data packets to the source terminal packed therein, the network data packet further including a first-packet offset field having a predetermined field length, the first-packet offset field for recording a first-packet offset value that identifies the location in the network data packet payload of at least a portion of a first input data packet that is packed in the network data packet payload and that has not been partially packed in a network data packet payload of a previous network data packet;

recording a first-packet offset value in the first-packet offset field, the length of the first-packet offset value equaling the predetermined first-packet offset field length; and transmitting the network data packet from the source terminal to the destination terminal wherein the predetermined first-packet offset field length is determined during a connection negotiation conducted between the source terminal and the destination terminal.

7. The method of claim 6, wherein the predetermined first-packet offset field length is determined by the destination terminal during a connection negotiation conducted between the source terminal and the destination terminal prior to the generating and transmitting of the network data packet.

8. The method of claim 6, wherein the network data packet further includes one or more other data fields and the predetermined first-packet offset field length is determined based on the length of the one or more other data fields.

9. The method of claim 8, wherein the one or more other data fields includes a source identifier field and a sequence number field.

10. The method of claim 6, wherein the one or more input data packets are packed at selected intervals in the network data packet and the number of bits in the network data packet between the selected intervals depends on the predetermined first-packet offset field length.

11. A method of data transmission in a data communication network, comprising:

receiving network data packets from a source terminal of the data communication network at a destination terminal of the data communication network, wherein a respective network data packet comprises a header portion and a payload portion, the payload portion comprising at least a portion of one or more input data packets that were inputted to the source terminal, and the header portion comprising at least a network packet sequence number and a first-packet offset value that indicates where, within the payload portion, a first new input data packet, or portion thereof, begins;

locating a starting position of a first input data packet of a first network data packet based on the first-packet offset value; and unpacking at least one input data packet or portion of an input data packet from the first network data packet wherein the network data packet includes at least one portion of an input data packet not fully contained in the network data packet, the method further comprising appending the portion of the input data packet to another portion of the input data packet unpacked from a different network data packet.

12. The method according to claim 11, wherein the method further comprises retaining the unpacked portion of the input data packet in a memory with a timer, and deleting the unpacked portion from the memory when a period of time measured by the timer expires.

\* \* \* \* \*